United States Patent
Koga et al.

(10) Patent No.: US 8,442,130 B2
(45) Date of Patent: May 14, 2013

(54) COMMUNICATION APPARATUS, COMMUNICATION METHOD AND INTEGRATED CIRCUIT

(75) Inventors: Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 974 days.

(21) Appl. No.: 12/256,945

(22) Filed: Oct. 23, 2008

(65) Prior Publication Data

US 2009/0110096 A1   Apr. 30, 2009

(30) Foreign Application Priority Data

Oct. 25, 2007 (JP) ................................. 2007-277641

(51) Int. Cl.
*H04K 1/10* (2006.01)
(52) U.S. Cl.
USPC ........... 375/260; 375/262; 375/267; 375/271; 375/295; 375/354
(58) Field of Classification Search .................. 375/259, 375/260, 262, 267, 270, 299, 305, 316, 346, 375/350, 261, 264, 272, 290, 295, 309, 322, 375/340–344
See application file for complete search history.

(56) References Cited

U.S. PATENT DOCUMENTS

| | | | |
|---|---|---|---|
| 7,502,341 B2 | 3/2009 | Matoba | |
| 7,848,458 B2 | 12/2010 | Ochiai | |
| 7,953,167 B2 | 5/2011 | Ode | |
| 7,961,799 B2 * | 6/2011 | Kwak et al. | 375/260 |
| 7,961,816 B2 * | 6/2011 | Sheu | 375/316 |
| 8,232,668 B2 * | 7/2012 | Ikeda | 307/3 |
| 8,295,390 B2 * | 10/2012 | Koga et al. | 375/295 |
| 2003/0133473 A1 | 7/2003 | Manis | |
| 2006/0165047 A1 * | 7/2006 | Kodama et al. | 370/350 |
| 2007/0076666 A1 | 4/2007 | Riveiro | |
| 2007/0230377 A1 | 10/2007 | Nosaka | |
| 2007/0297385 A1 | 12/2007 | Ishizu | |
| 2008/0130640 A1 * | 6/2008 | Hurwitz et al. | 370/389 |
| 2009/0041169 A1 * | 2/2009 | Fujita et al. | 375/354 |
| 2010/0046654 A1 | 2/2010 | Ode | |
| 2011/0200138 A1 | 8/2011 | Ode | |

FOREIGN PATENT DOCUMENTS

| | | |
|---|---|---|
| JP | 2006-94005 | 4/2006 |
| JP | 2006-313993 | 11/2006 |
| JP | 2007-259176 | 10/2007 |
| WO | 03/021846 | 3/2003 |
| WO | 2006/046307 | 5/2006 |
| WO | 2006/073138 | 7/2006 |
| WO | 2006/088081 | 8/2006 |
| WO | 2006/092856 | 9/2006 |
| WO | 2006/126738 | 11/2006 |
| WO | WO 2006121012 A1 * | 11/2006 |
| WO | 2007/039723 | 4/2007 |
| WO | 2007/116835 | 10/2007 |

OTHER PUBLICATIONS

International Search Report dated Jun. 17, 2009.

\* cited by examiner

*Primary Examiner* — Hirdepal Singh
(74) *Attorney, Agent, or Firm* — Dickinson Wright PLLC

(57) ABSTRACT

A communication apparatus carries out multicarrier communication with another communication apparatus through a transmission channel. The communication apparatus includes a first communication unit which carries out communication using a subcarrier at a first frequency band; a second communication unit which carries out communication using a subcarrier at a second frequency band higher than the first frequency band; and a third communication unit which carries out communication by synchronizing the first communication unit with the second communication unit and concurrently using the first and second frequency bands.

23 Claims, 17 Drawing Sheets

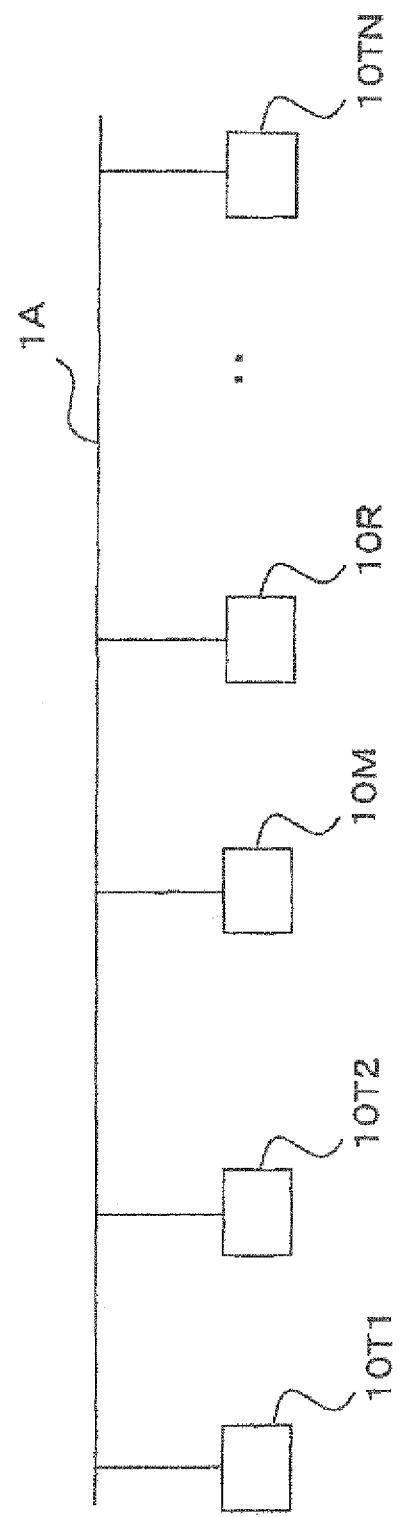

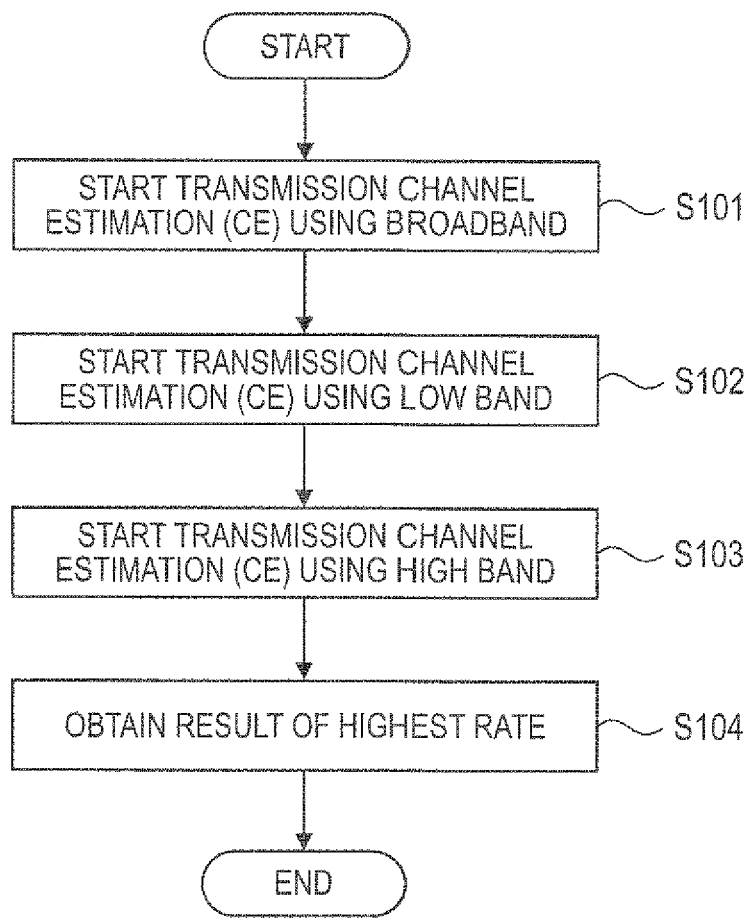

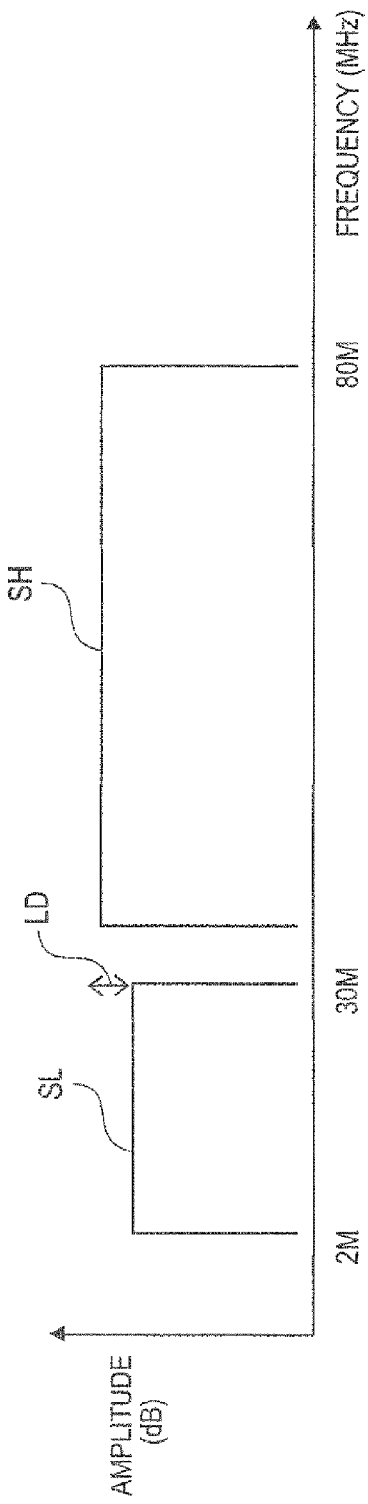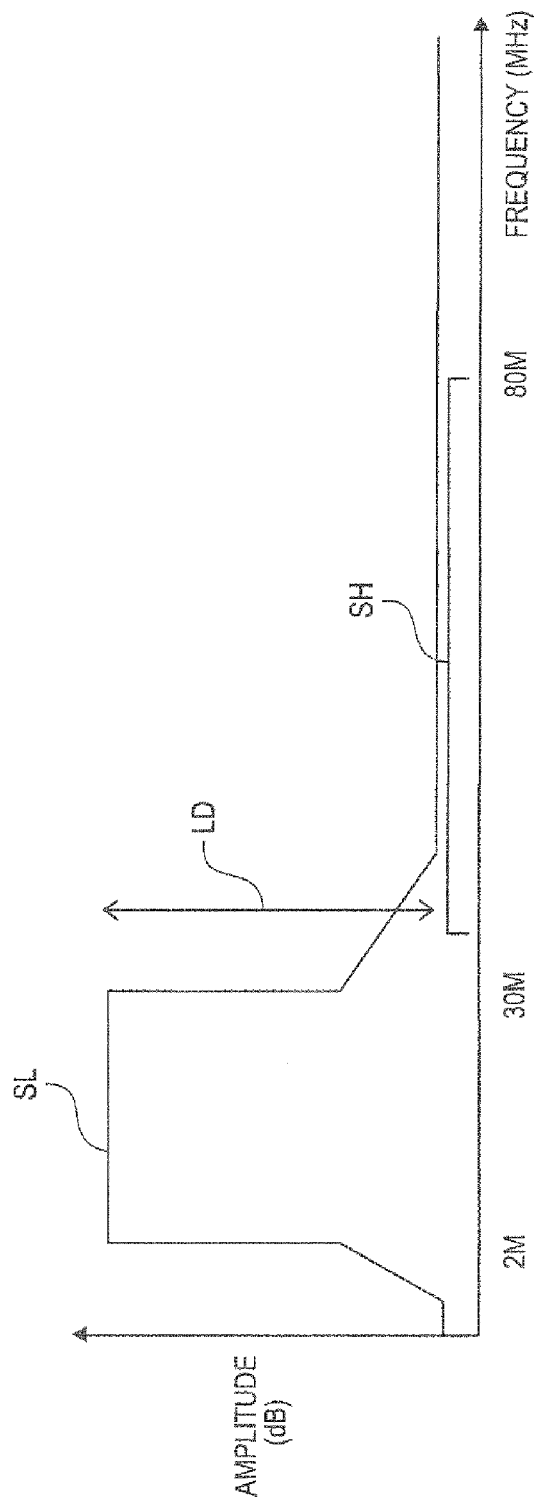

COMMUNICATION APPARATUS, COMMUNICATION METHOD AND INTEGRATED CIRCUIT

BACKGROUND

1. Technical Field

The present invention relates to a communication apparatus, a communication method, and an integrated circuit capable of carrying out communication using a plurality of subcarriers.

2. Background Art

A transmission scheme of using a plurality of subcarriers, such as an OFDM (Orthogonal Frequency Division Multiplexing) scheme has a big advantage of realizing high quality communication even over a transmission channel of a severe condition, and thus is used for wired communication such is as power line communication as well as wireless communication. A frequency band usable for the power line communication is generally in the range of 2 MHz to 30 MHz as in JP-A-2007-259176. The frequency bands usable for the power line communication are each assigned as a proper value of each nation according to the national law of each nation. However, it is considered that a broader frequency band containing a higher frequency is used.

As for the transmission of the OFDM scheme, a communication speed (communication rate) in the broad frequency band is improved theoretically, but the communication rate is not always improved actually. That is, attenuation generally increases as a frequency band is higher and the output in the high frequency band is relatively restrictive in the power line communication in consideration of an influence on other electrical devices (depending on nations, the output needs to be lowered by 27 dB or more in the power line communication using a frequency up to 80 MHz, compared to the power line communication using a frequency of 30 MHz or less). In addition, under such an environment, a level difference between a spectrum of a low band (for example, 30 MHz or less) and a spectrum of a high band (for example, 30 MHz to 80 MHz) is inclined to increase when the power line communication apparatus of a broadband expanded up to 80 MHz is realized. Accordingly, since a wide dynamic range is necessary for an AD converter or a DA converter, it is not easy to realize a power line communication apparatus capable of carrying out communication in a state where the low band and the high band is both used optimally. Moreover, since variation in the state of the power line depends on the frequency band, the power line communication of the broadband does not necessarily become a communication scheme of the highest rate.

A frequency spectrum illustrated in FIG. 17 is a spectrum for the power line communication used for a frequency band in the range of 2 MHz to 80 MHz. There is a level difference LD of an output between a spectrum SL at a low frequency band (2 MHz to 30 MHz) and a spectrum SH at a high frequency band (30 MHz to 80 MHz). The level difference LD between the low band spectrum and the high band spectrum generally increase when a TDM (Time Division Multiplex) is carried out using the low band and the high band simultaneously. Therefore, a dynamic range DR is necessary for the AD converter and the DA converter.

When a FDM (Frequency Division Multiplex) is carried out using the low band and the high band, a perspective problem (which refers to a phenomenon that the level difference is considerable between the low band and the high band) of the low band and the high band occurs in addition to the restriction of the TDM, thereby requiring the wider dynamic range. Moreover, in order to narrow the dynamic range in the FDM, a steep BPF (Band Pass Filter) is necessary. However, it is generally difficult to use the steep BPF. Therefore, when the FDM is carried out using the low band and the high band, it is necessary to determine a communication scheme in consideration of signal leakage in a frequency band of an opponent side.

Such a circumstance is not limited to the power line communication carrying out communication with the power line as a transmission channel, but the same is applied to multicarrier communication carrying out communication with another wired transmission channel or multicarrier communication carrying out communication with a wireless LAN.

SUMMARY

The following-mentioned embodiment is devised in view of the above-mentioned circumstances and an object of the embodiment is to provide a communication apparatus, a communication method, and an integrated circuit capable of carrying out efficient communication with a broad frequency band.

According to an aspect of the following-mentioned embodiment, a communication apparatus carries out multicarrier communication with a first other communication apparatus through a transmission channel. The communication apparatus includes: a first communication unit which carries out communication using a subcarrier at a first frequency band; a second communication unit which carries out communication using a subcarrier at a second frequency band higher than the first frequency band; and a third communication unit which carries out communication by synchronizing the first communication unit with the second communication unit and concurrently using the first and second frequency bands.

According to the configuration, there is provided the communication apparatus capable of carrying out efficient communication using the broad frequency band. For example, it is assumed that the first frequency band is in the range of 2 MHz to 30 MHz, that the second frequency band is in the range of 30 MHz to 80 MHz, and that a third frequency band is in the range of 2 MHz to 80 MHz. The first to third communication units may operate simultaneously or selectively. In addition, the first to third communication units may be realized by a common hardware device or by separated hardware devices. By synchronizing the first communication unit with the second communication unit for carrying out communication, it is possible to suppress a leakage signal of a communication signal caused by the other-side communication unit to a minimum. This advantage is particularly effective for a case where the first communication unit and the second communication unit operates separately and communication is carried out with two different communication apparatuses.

According to another aspect of the following-mentioned embodiment, a communication method of carrying out multicarrier communication with first other communication apparatus through a transmission channel includes: carrying out first communication using a subcarrier at a first frequency band; carrying out second communication using a subcarrier at a second frequency band higher than the first frequency band; and carrying out third communication by synchronizing the first communication with the second communication and concurrently using the first and second communication.

According to the configuration, there is provided the communication method capable of carrying out efficient communication using the broad frequency band. For example, it is assumed that the first frequency band is in the range of 2 MHz to 30 MHz, the second frequency band is in the range of 30 MHz to 80 MHz, and the third frequency band is in the range of 2 MHz to 80 MHz. The first to third communication units may operate simultaneously or selectively. In addition, the first to third communication units may be realized by a common hardware device or by separated hardware devices. By synchronizing the first communication unit with the second communication unit for carrying out communication, it is possible to suppress a leakage signal of a communication signal caused by the other-side communication unit to a minimum. This advantage is particularly effective for the case where the first communication unit and the second communication unit operates separately and communication is carried out with two different communication apparatuses.

According to another aspect of the following-mentioned embodiment, an integrated circuit is used in a communication apparatus carrying out multicarrier communication with another communication apparatus. The integrated circuit includes: a first communication unit which carries out communication using a subcarrier at a first frequency band; a second communication unit which carries out communication using a subcarrier at a second frequency band higher than the first frequency band; and a third communication unit which carries out communication by synchronizing the first communication unit with the second communication unit and concurrently using the first and second frequency bands.

According to the configuration, there is provided the communication apparatus capable of carrying out efficient communication using the broad frequency band. For example, it is assumed that the first frequency band is in the range of 2 MHz to 30 MHz, the second frequency band is in the range of 30 MHz to 80 MHz, and the third frequency band is in the range of 2 MHz to 80 MHz. The first to third communication units may operate simultaneously or selectively. In addition, the first to third communication units may be realized by a common hardware device or by separated hardware devices. By synchronizing the first communication unit with the second communication unit for carrying out communication, it is possible to suppress the leakage signal of a communication signal caused by the other-side communication unit to a minimum. This advantage is particularly effective for the case where the first communication unit and the second communication unit operates separately and communication is carried out with two different communication apparatuses.

As described above, it is possible to provide a communication apparatus, a communication method, and an integrated circuit capable of carrying out efficient communication using a broad frequency band.

BRIEF DESCRIPTION OF THE DRAWINGS

FIG. 1 is a diagram illustrating an overall configuration of an example of a power line communication system for realizing a communication system;

FIG. 6 is a flowchart illustrating a sequence of transmission channel estimation in the PLC modem according to the embodiment;

FIGS. 14A and 14B are diagrams illustrating each frequency spectrum when the PLC modem operating as the repeater performs a repeating operation lo according to the embodiment;

DETAILED DESCRIPTION

Hereinafter, an embodiment will be described with reference to the drawings.

As illustrated in FIG. 1, a power line communication system includes a plurality of PLC (Power Line Communication) modems 10M, 10R 10T1, 10T2, . . . , and 10TN connected to a power line 1A. In FIG. 1, five PLC modems are illustrated, but any number of PLC modems is connected. The PLC modem 10M which serves as a master manages a connection state (link state) of other PLC modem 10T1, . . . , and 10TN which serve as slaves. In addition, the PLC modem 10R serves as a repeater which repeats communication between other PLC modems. However, the PLC modem which serves as the master and the PLC modem which serves as the repeater are not essential elements.

In the following description, the terms of the PLC modem 10M, 10R, 10T1, 10T2, . . . , and 10TN are used when the master, the repeater, and specific slaves are mentioned, and the term of PLC modem 10T is used when the stave is generally mentioned. In addition, a term of a PLC modem 10 is used when the PLC modem is mentioned without designation of the master and slave.

The power line 1A is illustrated by one line in FIG. 1, but is a conductive wire which actually has two or more lines. The PLC modem 10 is connected to two lines thereof.

Figure 2A:
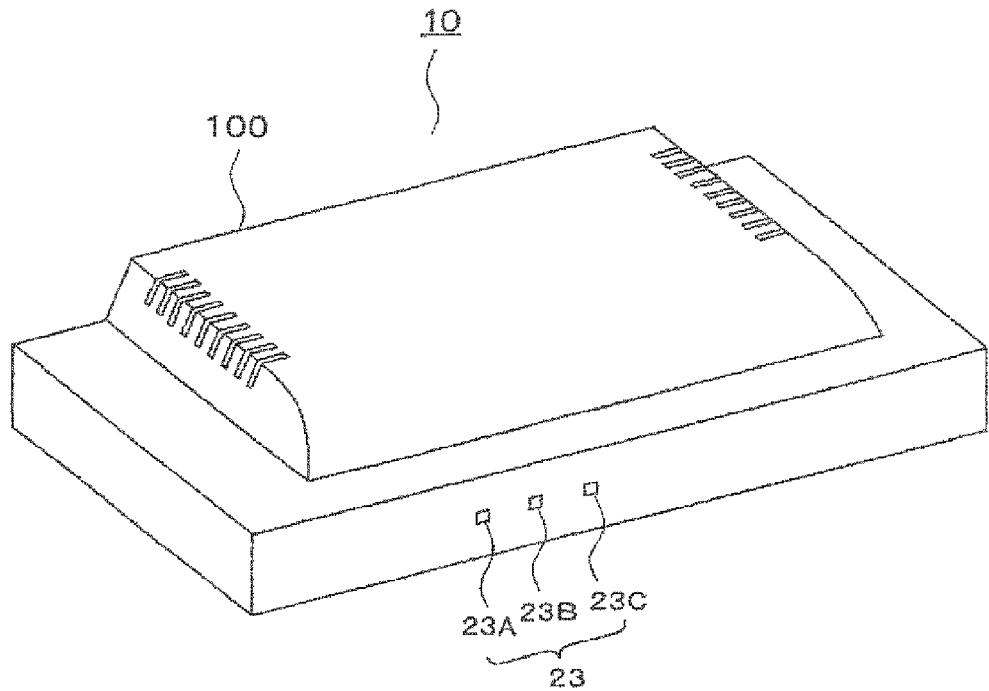
FIG. 2A is a diagram illustrating an appearance of a PLC modem view from a front side according to an embodiment.
Figure 2B:
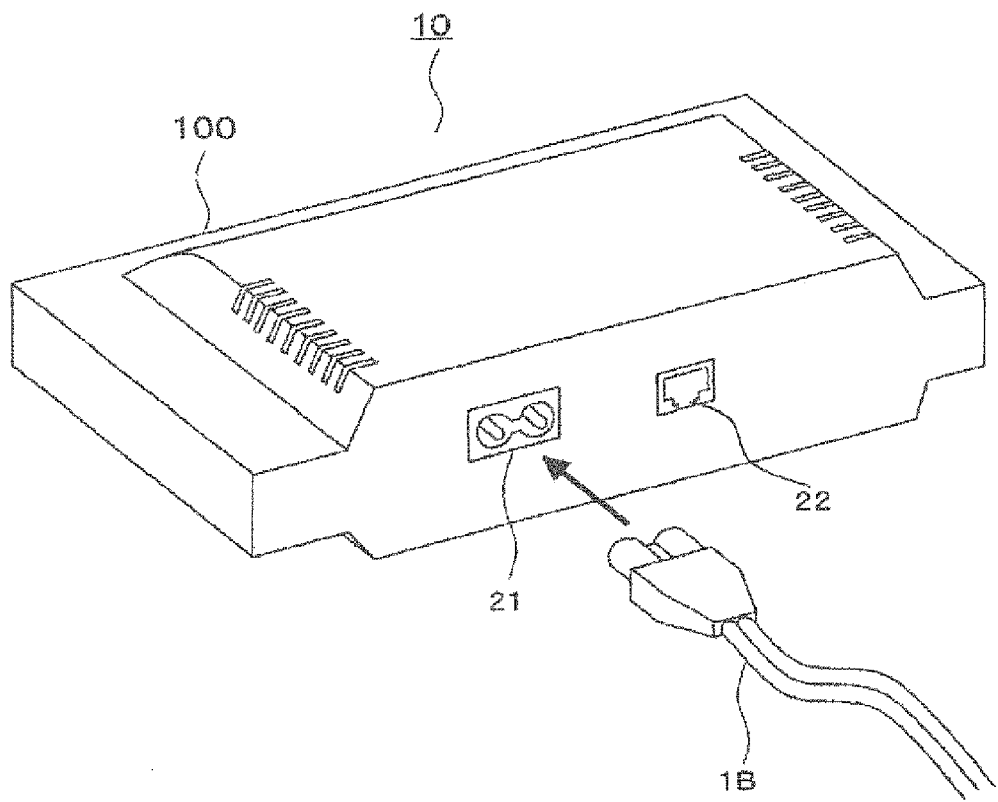
FIG. 2B is a diagram illustrating the appearance of the PLC modem view from a back side according to the embodiment.

Next, a specific configuration example of the PLC modems 10M, 10R, is and 10T illustrated in FIG. 1 will be described. The PLC modems 10 illustrated in FIGS. 2A and 28 includes a casing 100; As illustrated in FIG. 2A, an indicator 23 containing LEDs (Light Emitting Diodes) 23A, 23B, and 23C is provided on the front surface of the casing 100. As illustrated in FIG. 2B, a power supply connector 21 and a modular jack 22 for a LAN (Local Area Network) such as an RJ45 are provided on the rear surface of the casing 100. A power supply cable 1B is connected to the power supply connector 21 and a LAN cable (which is not illustrated in FIGS. 2A and 2B) is connected to the modular jack 22. Additionally, a Dsub (D-subminiature) connector may be provided in the PLC modem 10 so that the Dsub cable is connected.

Figure 3:
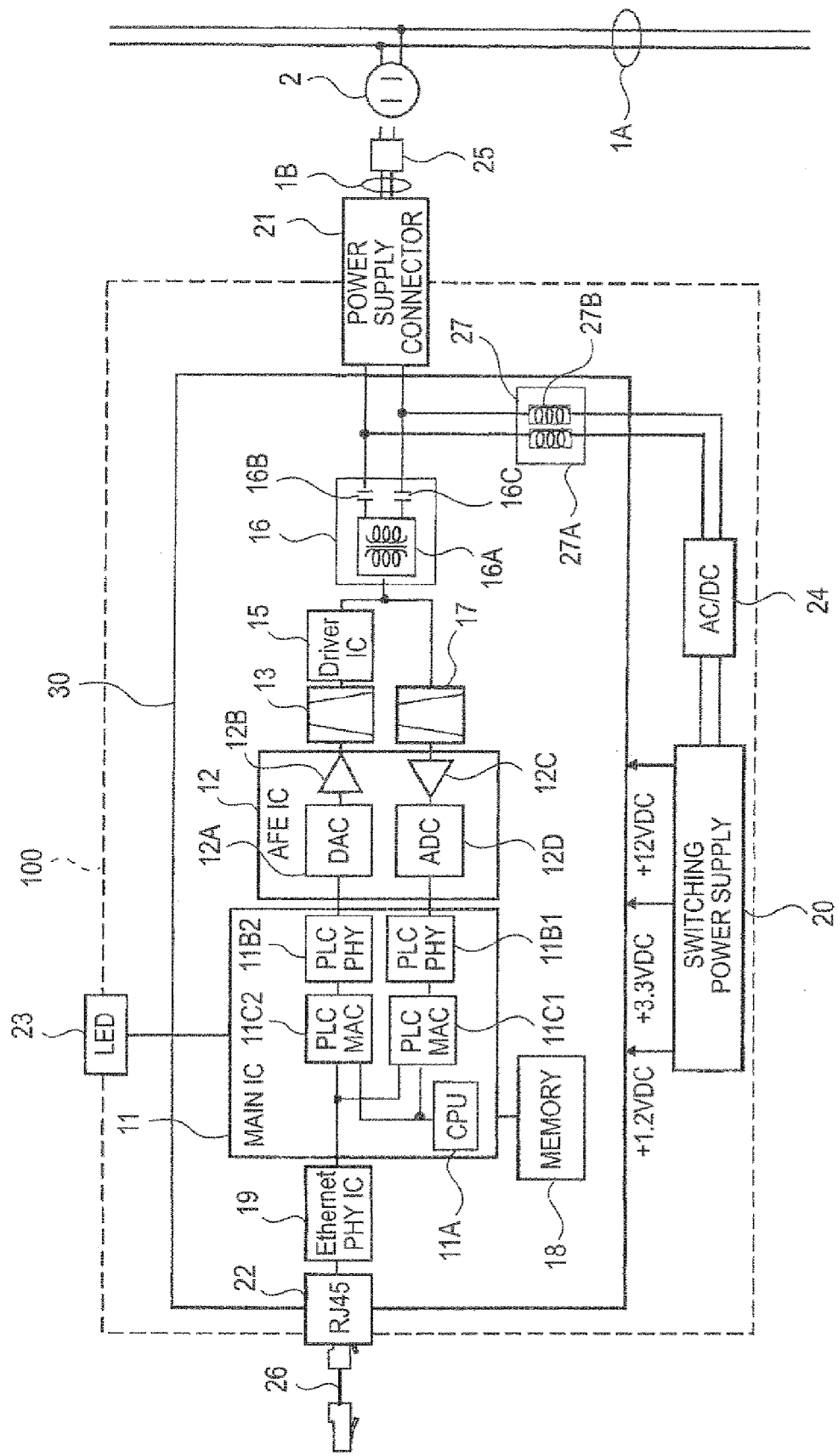
FIG. 3 is a block diagram illustrating a hardware example of the PLC modem according to the embodiment.

The PLC modem 10 includes a circuit module 30 and a switching power supply 20, as illustrated in FIG. 3. The switching power supply 20 supplies various types (for example, +1.2 V, +3.3 V, and +12V) of voltage to the circuit module 30 and includes a switching transformer and a DC-DC converter (which are not illustrated), for example. Power is supplied from the power supply connector 21 to the switching power supply 20 via an impedance upper 27 and an AC/DC converter 24.

The circuit module 30 is provided with a main IC (Integrated Circuit) 11, an AFE IC (Analog Front END Integrated Circuit) 12, a lowpass filter (LPF) 13, a driver IC 15, a coupler 16, a bandpass filter (BPF) 17, a memory 18, and an Ethernet PHY IC (Physical layer Integrated Circuit) 19. The coupler 16 is connected to the power supply connector 21 and is also connected to the power line 1A via the power supply cable 1B a power supply plug 25, and an outlet 2. The indicator 23 is connected to the main IC 11 and the LAN cable 26 used for connection to devices such as a personal computer is connected to the modular jack 22. In addition, the main IC 11 also serves as a communication controller in a case of power line communication.

The main IC 11 includes a CPU (Central Processing Unit) 11A, PLC MAC (Power Line Communication Media Access Control layer) blocks 11C1 and 11C2, and PLC PRY (Power Line Communication/Physical layer) blocks 11B1 and 11B2. A 32-bit RISC (Reduced Instruction Set Computer) processor is mounted in the CPU 1A. The PLC MAC block 11C2 manages a MAC layer (Media Access Control layer) of a transmission signal and the PLC MAC block 11C1 manages a MAC layer of a reception signal. The PLC PHY block 11B2 manages a PHY layer (Physical layer) of a transmission signal and the PLC PHY block 11B1 manages a PHY layer of a reception signal. The AFE/IC 12 includes a DA converter (DAC: D/A converter) 12A, an AD converter (ADC: A/D converter) 12D, and variable gain amplifiers (VGA: Variable Gain Amplifier) 12B and 12C. The coupler 16 includes a coil transformer 16A and coupling capacitors 16B and 16C. In addition, the CPU 11A controls operations of the PLC MAC block 11C1 and 11C2 and the PLC PHY block 11B1 and 11B2 using data stored in the memory 18 and also controls the PLC modem 10 as a whole.

Communication by means of the PLC modem 10 in FIG. 3 is carried out on the whole as follows. That is, data input from the modular jack 22 is transmitted to the main IC 11 via the Ethernet PHY IC 19, and a digital transmission signal is generated by performing a digital signal process. The generated digital transmission signal is converted into an analog signal by the DA converter (DAC) 12A of the AFE IC 12 and output to the power line 1A via the lowpass filter 13, the driver IC 15, the coupler 16, the power connector 21 the power supply cable 1B, the power supply plug 25, and the outlet 2.

The signal received from the power line 1A is output to the bandpass filter 17 via the coupler 16, its gain is adjusted by the variable gain amplifier (VGA) 12C of the AFE IC 12, and the signal is converted into a digital signal by the AD converter (ADC) 12D. The converted digital signal is transmitted to the main IC 11 and converted into digital data by performing a digital signal process. The converted digital data is output from the modular jack 22 via the Ethernet PHY IC 19.

In FIG. 3, the PLC modem 10 carries out an OFDM communication using a frequency band in the range of 2 MHz to 80 MHz. At this time, one among three types, that is, the OFDM communication (broadband communication) using the entire frequency band in the range of 2 MHz to 80 MHz, the OFDM communication (low band communication) using the frequency band in the range of 2 MHz to 30 MHz, and the OFDM communication (high band communication) using the frequency band in the range of 30 MHz to 80 MHz is selected. The specific function in the broadband communication, the low band communication, and the high band communication is realized basically with an equal hardware device, but the switch thereof is performed by the CPU 11A.

The PLC modem 10 carries out communication through an equal power line, and thus communication by the TDM is basically carried out. In addition, the FDM communication can be carried out with the low band communication and the high band communication.

Figure 4:
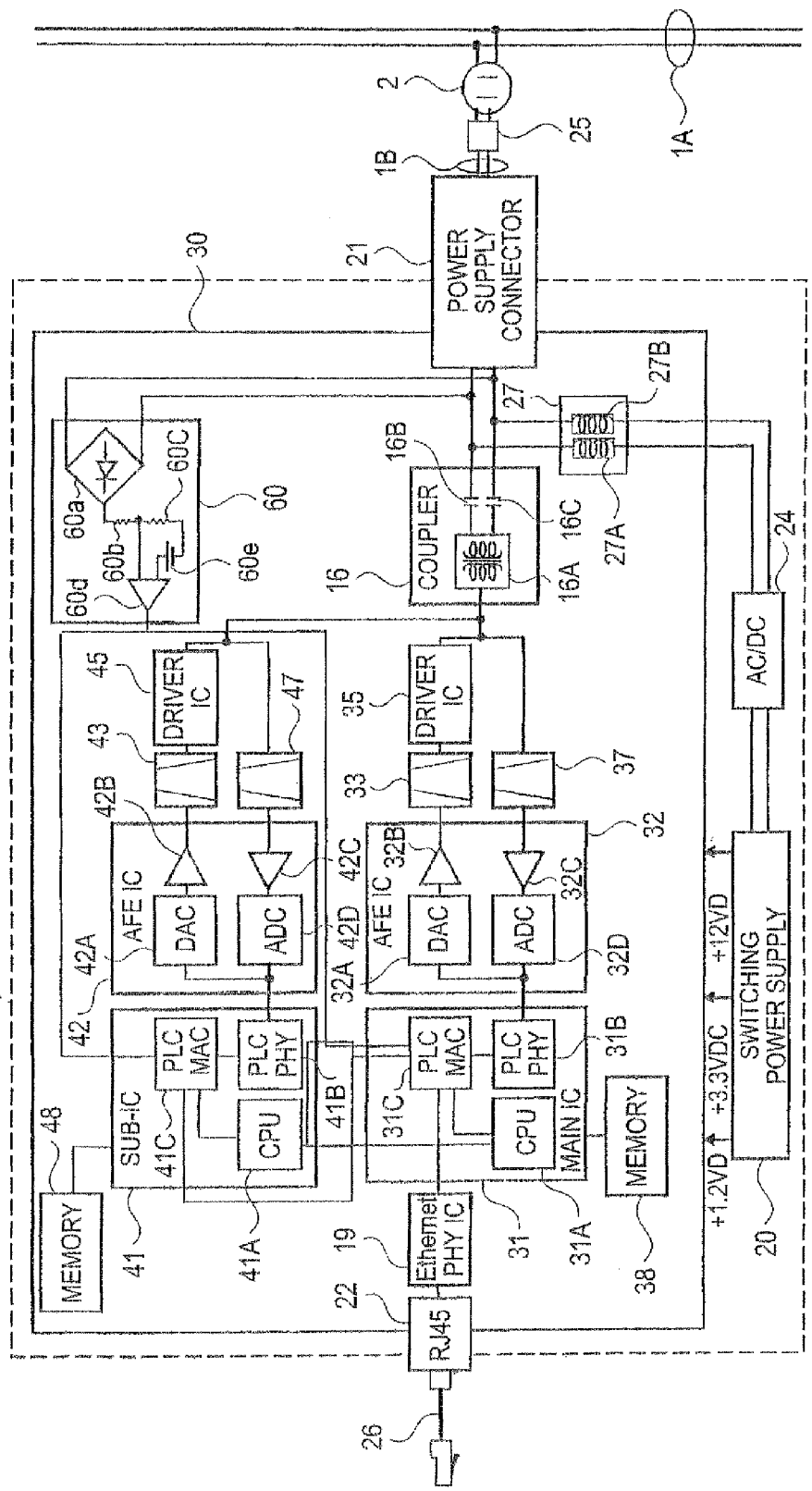
FIG. 4 is a block diagram illustrating another hardware example of the PLC modem according to the embodiment.

As illustrated in FIG. 4, the PLC modem 10 has the same configuration as that of the PLC modem 10 illustrated in FIG. 3, except that two hardware units for carrying out communication are provided. That is, the PLC modem 10 includes the circuit module 30 and the switching power supply 20. In addition, power is supplied from the power supply connector 21 to the switching power supply 20 via the impedance upper 27 and the AC/DC converter 24.

The circuit module 30 has one hardware unit which performs communication processing and includes a main IC (Integrated Circuit) 31, an AFE IC (Analog Front END Integrated Circuit) 32, a lowpass filter (LPF) 33, and a driver IC 35 and one hardware unit which performs communication processing and includes a sub-IC 41, an AFE IC 42, a lowpass filter 43, and a driver IC 45. These hardware units have the same constituent elements as the main IC 11, the AFE IC 12, the lowpass filter 13, and the driver IC 15 of the PLC modem 10 illustrated in FIG. 3. Therefore, the detailed description is omitted. In addition, the coupler 16, the bandpass filter (BPF) 17, the memory 18, and the Ethernet PHY IC 19 are provided like the PLC modem 10 illustrated in FIG. 3. The main IC 31 serves as a communication controller in the power line communication. The memory 48 stores data used by the sub-IC 41.

The circuit module 30 is provided with an AC cycle detector 60. The AC cycle detector 60 generates a synchronization signal which is necessary to control at a common timing by the PLC modems 10. The AC cycle detector 60 includes a diode bridge 60a, resistors 60b and 60c, a DC power supplier 60e, and a capacitor 60d. The diode bridge 60a is connected to the resistor 60b. The resistor 60b is connected in series to the resistor 60c. The resistors 60b and 60c are connected in parallel to one terminal of the capacitor 60d. The DC power supplier 60e is connected to the other terminal of the capacitor 60d. The synchronization signal is generated as the following manner That is, an AC power waveform AC of commercial power supplied to the transmission channel 1A, that is, zero crossing points of voltage of an AC waveform formed by sine waves of 50 Hz or 60 Hz is detected and the synchronization signal based on the timing at that time is generated. An example of the synchronization signal is a square wave formed by a plurality of pulses synchronized with the zero crossing points of the AC power waveform.

The communication (low band communication) using a subcarrier of the low frequency band (2 MHz to 30 MHz) is realized basically by the main IC 31 and the AFE IC 32. The communication (high band communication) using a subcarrier of the high frequency band (30 MHz to 80 MHz) is realized basically by the sub-IC 41 and the AFE IC 42. Moreover, the communication (broadband communication) using the low frequency band and the high frequency band is realized by both the hardware units.

As illustrated in FIG. 4, the PLC modem 10 having the configuration in FIG. 4 can carry out communication using two communication schemes of the high band communication and the low band communication together since the PLC modem 10 include the two hardware units (actually, two PLC modems are included). In this case, as for constituent elements such as the switching power supply 20, only one unit is sufficient to realize the communication. Switch control between the two hardware units and transmission channel estimation described below are performed by the CPU 31A of the main IC 31.

In the example of FIG. 4, two communication units are connected between the MAC and the CPU and efficient communication can be carried out by adjusting the connected portion. A method of configuring the two hardware units is not limited to the above-described method. That is, a plurality of the Ethernet PHY ICs 21 may be provided and connected to the main IC 31 and the sub-IC 41 or may be included within the IC 31. In addition, the AFE IC 32 and AFE IC 42 may be incorporated with each other or may be incorporated with the main IC 31 and the sub-IC 41. Additionally, the Ethernet PHY IC may be included within the main IC 31 and the sub-IC 42, and the main IC 31 and the sub-IC 41 may be controlled using a switching HUB or the like.

Figure 5:
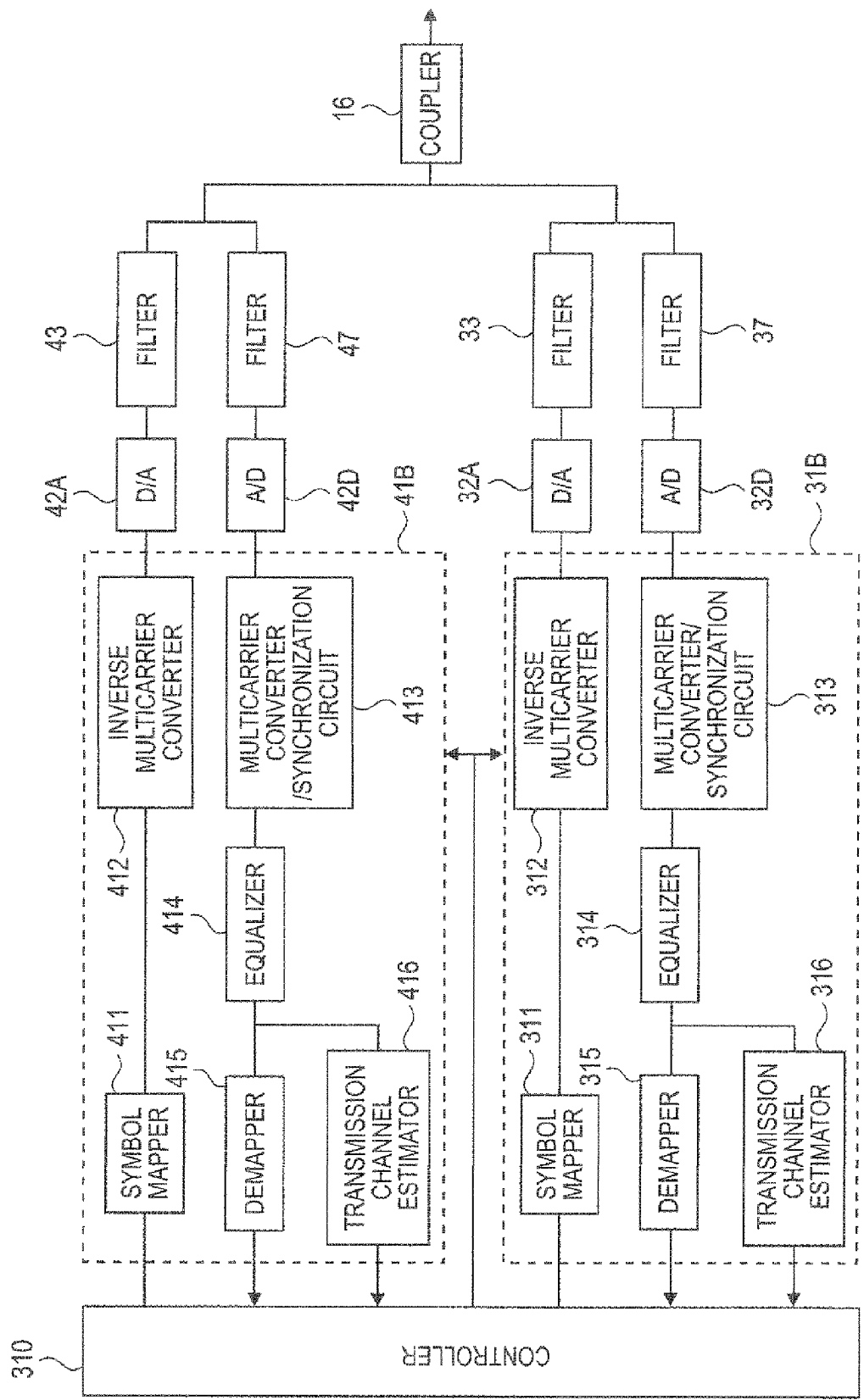
FIG. 5 is a block diagram illustrating an example of a digital signal process performed in a PLC PHY block of the PLC modem according to the embodiment.

As illustrated in FIG. 5, a PLC PHY block 31B of the main IC 31 has functions of a symbol mapper 311, a inverse multicarrier converter 312, a multicarrier converter/synchronization circuit 313, an equalizer 314, a demapper 315, and a transmission channel estimator 316. A PLC PHY block 41B of the sub-IC 41 has functions of a symbol mapper 411, an inverse multicarrier converter 412, a multicarrier converter/synchronization circuit 413, an equalizer 414, a demapper 415, and a transmission channel estimator 416. In the drawing, a serial-parallel converter which converts mapped serial data into parallel data and a parallel-serial converter which converts parallel data on a frequency axis into serial data are not illustrated.

The symbol mappers 311 and 411 convert bit data to be transmitted into symbol data and perform symbol mapping (for example, a PAM modulation) in accordance with each symbol data. The inverse multicarrier converters 312 and 412 which are inverse wavelet converters, for example, perform an inverse wavelet process on the parallel data to generate data on a time axis and generate a sample value series representing transmission symbols. This data is transmitted to the DA converter (DAC) 32A and 42A of the AFE ICs 32 and 42, composited by the filters 33 and 43, and transmitted to the power line 1A via the coupler 16.

The multicarrier converter/synchronization circuit 313 and 413 convert reception digital data (sample value series sampled at the same sample rate as that at transmission time), which are input from the power line via the coupler 16 and obtained from the AD converters (ADC) 32D and 42D via the filters 37 and 47, into data on the frequency axis in synchronization with the reception digital data. When the inverse multicarrier converters 312 and 412 are the inverse wavelet converters, the conversion of the data on the frequency axis is performed by the wavelet converters. The reception data converted into the data on the frequency axis are transmitted the demapper 315 and 415 via the equalizers 314 and 414. The demappers 315 and 415 obtain the reception data by calculating an amplitude value of each subcarrier and determining a reception signal.

The transmission channel estimators 316 and 416 determine the state of the transmission channel in each frequency band. The determination for the state of the transmission channel is performed in accordance with results obtained by transmitting and receiving random data which are known between other PLC modems. A controller 310 controls the operations of the PLC PHY blocks 31B and 41B and the determination for the state of the transmission channel and is realized by the CPU 31A and 41A.

Communication carried by the PLC modem 10 illustrated in FIG. 4 is also carried out in the sequence in which the PLC modem 10 illustrated in FIG. 3 carries out the communication. A different point is that the OFDM communication (low band communication) using the frequency band in the range of 2 MHz to 30 MHz is mainly carried out by the main IC 31 and the AFE IC 32, the OFDM communication (high band communication) using the frequency band in the range of 30 MHz to 80 MHz is mainly carried out by the sub-IC 41 and the AFE IC 42, and the OFDM communication (broadband communication) using the entire frequency band in the range of 2 MHz to 80 MHz is carried out by the entire device.

In the communication system illustrated in FIG. 1, the determination (hereinafter, referred to as a transmission channel estimation or a CE (Channel Estimation)) for the state of the transmission channel is performed before the start of communication. This transmission channel estimation is performed between the PLC modems 10 to carry out communication one another and performed using the three types, that is, the broadband, the low band, and the high band. Then, the communication is carried out using the highest rate obtained from estimation results.

FIG. 6 shows a sequence of the transmission channel estimation. In Step S101, the estimation is performed using the broadband (2 MHz to 80 MHz), In Step S102, the transmission channel estimation is performed using the low band (2 MHz to 30 MHz). In Step S103, the transmission channel estimation is performed using the high band (30 MHz to 80 MHz). The result of the highest rate (a band in which the communication can be carried out at the highest rate) is obtained from the estimation results (Step S104). Then, the communication starts after a communication scheme between the estimation results is determined. The details for the communication scheme determined by the transmission channel estimation includes a modulation method of each carrier, a use FEC (error correction), and use band. These details are also referred to as a tone map. Information on a symbol length, the number of carriers, a type (a FFT method, a wavelet method, or the like) of multicarrier conversion may be transmitted or received with the transmission channel estimation.

In the transmission channel estimation (CE), one communication scheme may be determined or a plurality of communication schemes may be determined for one other-side PLC modem. In addition, the CE may be performed in synchronization with an AC power supply or another synchronization signal or in an asynchronous manner. Considering that a frequency characteristic or a noise of the transmission channel varies in synchronization with the AC power supply, it is preferable that the CE is performed in synchronization with the AC power supply and the plurality of communication schemes are used for one opponent PLC modem. Moreover, the selected and used communication scheme may be indicated by the indicator 23. When the CE is performed in synchronization with the AC power supply, the synchronization signal obtained by the AC cycle detector 60 described above is used as a reference.

In the communication system illustrated in FIG. 1, the three types of frequency bands, that is, the broadband, the low band, and the high band can be used. When the low band and the high band are used, data may be separately transmitted to two PLC modems or may be received from the two PLC modems. In addition, when the PLC modem having the configuration illustrated in FIG. 4 is used, data can be transmitted and received to/from different PLC modems, respectively.

Figure 7A:
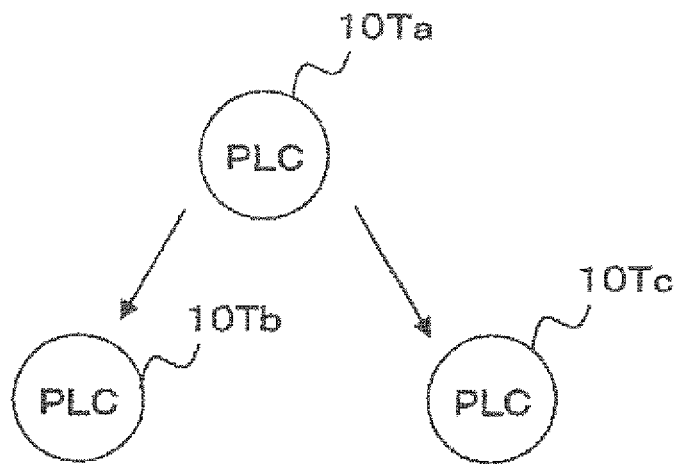
FIGS. 7A and 7B are diagrams for explaining the state of communication with two PLC modems using the PLC modem according to the embodiment.
Figure 7B:
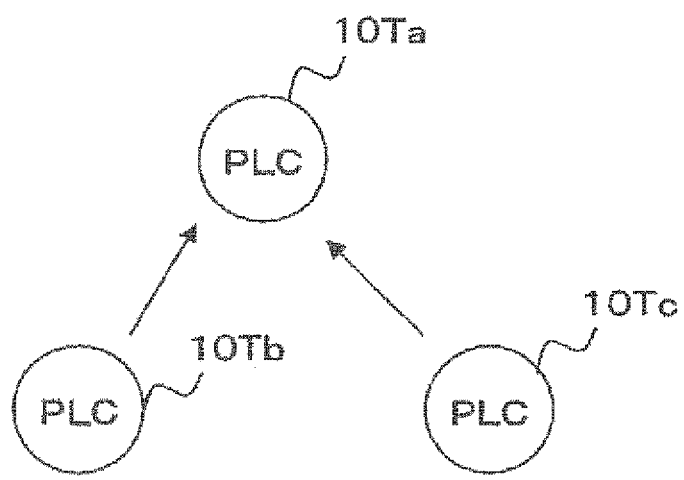

Referring to FIGS. 7A and 7B, communication between two PLC modems will be described. In FIG. 7A, the PLC modem 10Ta as a transmission side transmits data to the PLC modems 10Tb and 10Tc. The low band is used for the PLC modem 10Tb and the high band is used for the PLC modem 10Tc. When the OFDM communication is taken into consideration, for example, when a frequency interval of carriers is equal, in other words, when a symbol length is equal, signals are synchronized with each other for communication and thus become orthogonal even in a case where a signal using the low band and a signal using the high band separately communicate. Therefore, even in a case of leakage to another side, it is possible to make the signals orthogonal in first and second receivers and receive the signals by synchronizing the signals and sending data from a transmitter, thereby obtaining a good reception characteristic.

A best communication is achieved by synchronizing a header of a packet. The header may be synchronized at least in a symbol unit. When an Ack packet is transmitted from the PLC modems 10Tb and 10Tc as the reception sides to the PLC modem 10Ta as the transmission side, it is preferable to transmit the Ack packet in synchronization with a transmission signal transmitted from the PLC modem 10Ta as the transmission side. That is because the Ack packet transmitted from the PLC modems 10Tb and 10Tc as the reception sides can be synchronized. As for the CE, even when the CE is s requested separately in the low band and the high band, data can be transmitted by synchronizing the CE packets and making the CE packet orthogonal since the transmission side is common, and thus there is no problem. A low band transmission signal from the PLC modem 10Tb as the reception side is synchronized with a high band transmission signal, and a high band transmission signal from the PLC modem 10Tc as the reception side is synchronized with a low band reception signal. Accordingly, there is no problem.

As an example of a method for synchronizing the communication in a high band with the communication in a low band in unit of symbol, it is possible to provide with a method for synchronizing a start timing of the communication in the high band with that in the low band in unit of the symbol.

Synchronization of the communication processing in the high band with that in the low band orthogonalizes the signal in the high band and the signal in the low band each other. Accordingly, it is possible to reduce the leakage of a signal in one band into other band.

If the communication processing in the high band is synchronized with that in the low band with respect to all of the symbols, it is possible to reduce the leakage of a signal in one band into other band at a maximum. However the synchronization of the communication processing in the high band may be synchronized with that in the low band with respect to at least one symbol, and in that case, the reduction of the leakage can be achieved.

In FIG. 7B, the PLC modem 10Ta as the reception side receives data from the PLC modems 10Tb and 10Tc and the PLC modem 10Tb and the PLC modem 10Tc use the low band and the high band, respectively. In this case, it is preferable that the PLC modems 10Tb and 10Tc as the transmission side transmits signals in synchronization with the signals. The synchronization can be achieved by receiving a signal transmitted from another transmission side using a band which is not used for communication and measuring synchronization timing. Alternatively, the synchronization timing may be measured by receiving a signal (Ack packet or the like) transmitted from the PLC modem 10Ta as the reception side using a band which is not used by the PLC modems 10Tb and 10Tc. The own transmission packet is transmitted using the measured synchronization timing. In this way, the packet can be transmitted in synchronization from another transmission side. As for the CE, even when the CE is requested separately in the low band and the high band, the PLC modems 10Tb and 10Tc as the transmission sides are synchronized with a signal transmitted from the PLC modem 10Ta as the reception side in order to start the CE, and thus there is no problem.

To be brief, the synchronization timing is extracted and used as the synchronization timing for communication in the actually used band by receiving the signal used for the communication in the band which is not used for communication. In this way, the communication synchronized at least in the symbol unit can be carried out in both the bands. In addition, the measurement of the synchronization timing described above can be performed using a symbol synchronization circuit which is used for normal communication, for example. In this case, the synchronization communication is realized in both the bands by using the synchronization circuit to obtain the synchronization timing. However, the same advantage can be obtained by inserting a time stamp for the synchronization timing into a header and receiving the value of s the time stamp. Additionally, the synchronization is established by appending a flag for synchronization control to the header and using only a packet in which the flag is on. In this way, it is possible to establish the synchronization more precision.

The low band communication and the high band communication can be lo carried out separately when the PLC modem 10 having the configuration illustrated in FIG. 4 is used. However, when the completely asynchronous manner is used, the leakage signal from the other side may affect to the characteristics of each communication apparatus. Accordingly, it is preferable that both communication apparatuses communicate with each other at the is minimum in the synchronous manner in the symbol unit. That is because the perspective problem and a level difference of the output restriction on every band resulting from regulation of each nation have to be taken into consideration particularly in the environment of the power line communication. When both the communication apparatuses are synchronized with each other in the symbol unit, the leakage signal from the other side can be suppressed to a minimum even in an actual environment. In particular, characteristics are considerably improved in the OFDM using a FFT method containing a guard interval (GI). Even when the complete synchronization is not realized, synchronization deviation can be reduced by the GI in the OFDM using the GI as long as the synchronization deviation is controlled within a range of the GI. Taking the above description into consideration, it is preferable that the illustrated configuration operates in the synchronous manner in the symbol unit.

Here, a condition is that a frequency interval of the OFDM in the low band is at least the integral multiple of a frequency interval of the OFDM in the high band. In other words, a symbol length of the OFDM in the low band is the integral multiple of a symbol length of the OFDM in the high band. It is preferable that the interval is equal or the length is equal. In this way, in the OFDM using the FFT containing the GI, an orthogonality is maintained for at least one direction in a case where the synchronization deviation of a symbol is in a range of ±GI/2, when group delay is not present over the transmission channel. When the interval is equal or the length is equal, the orthogonality is completely maintained. When synchronization timing of the symbol is completely matched even in the OFDM using the wavelet, the orthogonality is completely maintained in the low band OFDM and the high band OFDM. In addition, even when the synchronization timing of the symbol is slightly deviated, the characteristic deterioration caused due to the collapse of the orthogonality is suppressed to a minimum.

When the signal using the low band and the signal using the high band are synchronized with each other at least in the symbol unit, the signals can become orthogonal one another in the relation in which the frequency interval or the symbol length of the OFDM in the low band is equal to the frequency interval or the symbol length of the OFDM in the high band. Moreover, when the frequency interval is the integral multiple (where the symbol length is the reciprocal of the integral multiple), the orthogonality is maintained at least from the low band to the high band on the assumption that the frequency interval of the OFDM in the low band is N and the frequency interval of the OFDM in the high band is 2N. In particular, effectiveness is achieved in an environment (where the low band is sufficiently in a high level in respect to the high band) where there is a level difference between the low band and the high band.

Here, timing which is not synchronized with a packet is referred to as reception timing, and timing which is extracted from a preamble of a packet by the synchronization circuit is referred to as synchronization timing. Normally, reception synchronization timings of a low band communication unit and a high band communication unit (which may be different communication apparatuses) are different from each other. In a case in which the different communication apparatuses transmit the low band signal and the high band signal in asynchronous manner, respectively, a reception side is not capable of handling the signal. Moreover, when filter characteristics are imperfect, signal leakage to the band of the other side may occur, thereby deteriorating characteristics.

However, it is considered that a signal is transmitted to a same opponent side using the low band and the high band in some cases. In this case, the symbol timing can be synchronized at least on a transmission side. When there is no influence on a transmission channel, and a low band communication unit (communication apparatus) and a high band communication unit (communication apparatus) perform a receiving process at an equal timing, the low band signal and the high band signal are orthogonal one another, and thus there is no influence to the other side.

In this way, when the band is divided into two bands of the low band and the high band, four patterns are obtained in combination of transmission and reception. It is necessary to achieve the synchronization timing at least in the symbol unit for any pattern, thereby suppressing the characteristic deterioration to a minimum.

Figure 8A:
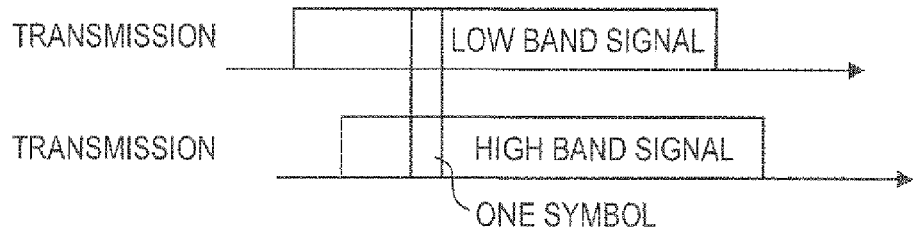
FIGS. 8A and 8B are diagrams for explaining operations of transmission in both low band and high band using the PLC modem according to the embodiment.
Figure 8B:
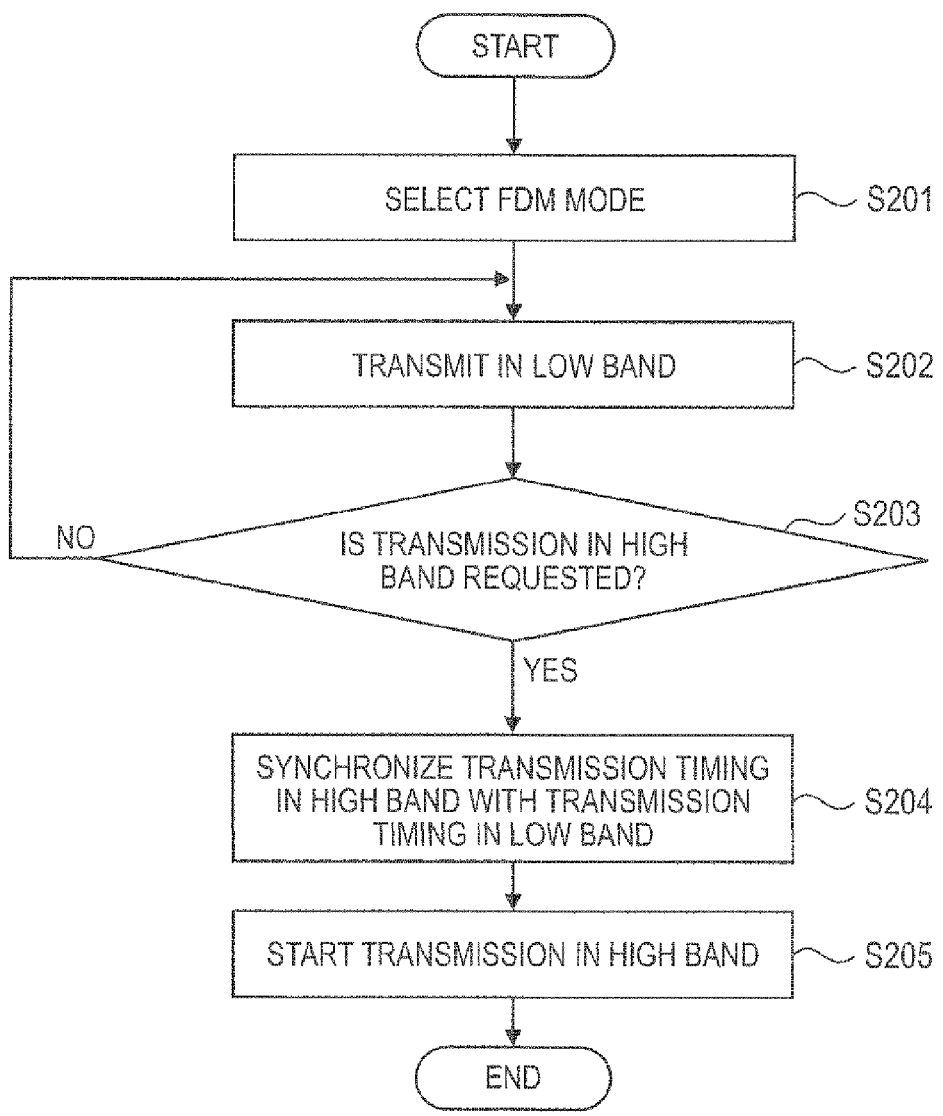

An operation of transmitting a signal in both the low band and the high band will be described with reference to FIGS. 8A and 8B. In Step S201, a mode (hereinafter, referred to as an FDM mode) where communication is carried out in the low band and the high band is selected. In Step S202, the transmission is performed using the low band. In Step S203, it is determined whether to request the transmission using the high band. When the transmission in the high band is not requested, the transmission in the low band continues.

Alternatively, when the transmission in the high band is requested, the transmission timing in the high band is synchronized with the transmission timing in the low band in Step S204. Subsequently, in Step S205, the transmission in the high band is started. As illustrated in FIG. 8A, by synchronizing the transmission timing in such a sequence, it is possible to achieve the synchronization in the symbol unit, thereby reducing the influence of the leakage signal.

When communication is simultaneously carried out using two bands in a separate manner in normal communication, the communication has a complex relation in welter of the transmission and reception if the both bands are measured, since the transmission and reception (for example, a data packet and an Ack packet) are repeated separately for each band. For that reason, it is considered that the patterns described here occur frequently A case where the transmission in the low band is requested during the reception in the high band is exemplified. A case where the reception in the high band is performed and transmission in the low band is performed will be described with reference to FIGS. 9A and 9B.

In Step S301, the FDM mode is selected. In Step S302, the reception in the high band is performed. In Step S303, it is determined whether the transmission in the low band is requested. When the transmission in the low band is not requested, the reception in the high band continues.

Figure 9A:
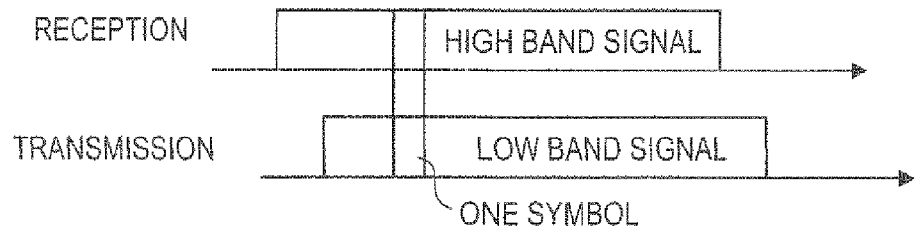
FIGS. 9A and 9B are diagrams for explaining operations of reception in the high band and transmission in the low band using the PLC modem according to the embodiment.
Figure 9B:
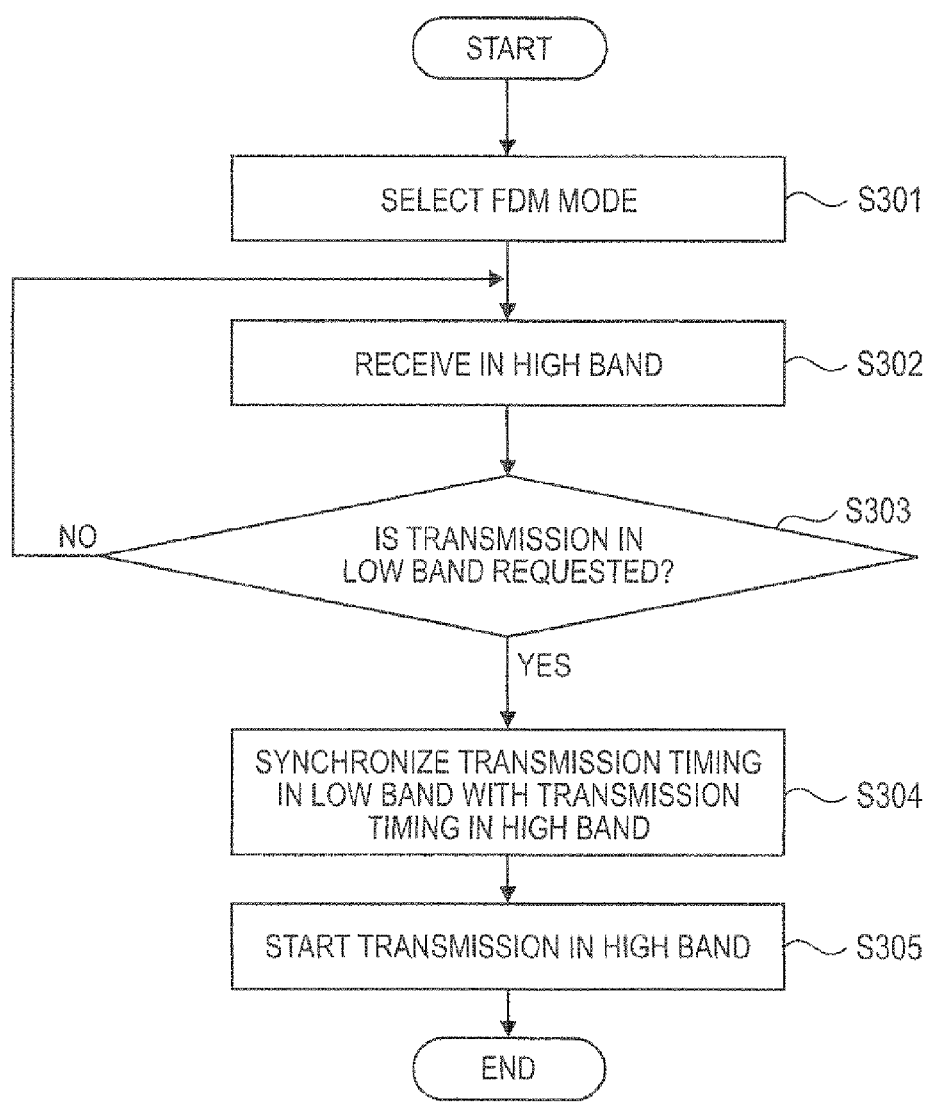

Alternatively, when the transmission in the low band is requested, the transmission timing in the low band is synchronized with the reception timing in the high band in Step S304. Subsequently, in Step S305, the transmission in the low band is started. By synchronizing the transmission timing in such a sequence, as illustrated in FIG. 9A, it is possible to achieve the synchronization in the symbol unit, thereby reducing the influence of the leakage signal The influence of the leakage signal can be reduced as much as possible with such synchronization, since generally the level of a transmission signal is larger than that of a reception signal and there is a high possibility that the transmission signal has an influence on the other side.

As for the transmission, a problem does not occur since tuning the synchronization timing in advance in this manner is possible. As for the reception, however, the synchronization timing is not tuned in a header of a packet, since the communication unit (communication apparatus) performs the reception other than the transmission. For that reason, the synchronization timing is obtained using a known signal (a preamble, referred to as a PR) or the like generally contained in the header of the packet, and control data or information is demodulated using the synchronization timing. At this time, when the synchronization timing is obtained using the PR of the subsequent packet and when timing at which a packet arrives is considerably different (see FIG. 10B), a data portion of the front packet may overlap with the PR of the subsequent packet. Even in a case where a transmission side synchronizes the transmission timing of two packets in the symbol unit, a mutual orthogonality collapses considerably and thus an influence (an influence on the subsequent packet from the front packet, an influence on the data portion of the front packet from the PR of the subsequent packet is small since the PR is a sine wave) on a packet of the other side occurs, when the synchronization timing of the front packet is deviated from the reception timing of the subsequent packet in a processing step. In order to avoid such a problem, it is necessary to receive the subsequent packet by setting the synchronization obtained from the front packet as an initial value. The influence on the subsequent packet from the other side in PR processing is suppressed to a minimum, when the reception timing used upon receiving the subsequent packet is matched with the synchronization timing of the front packet.

Next, an operation of receiving a signal in both the low band and the high band will be described with reference to FIGS. 10A, 10B and 11.

Figure 10A:
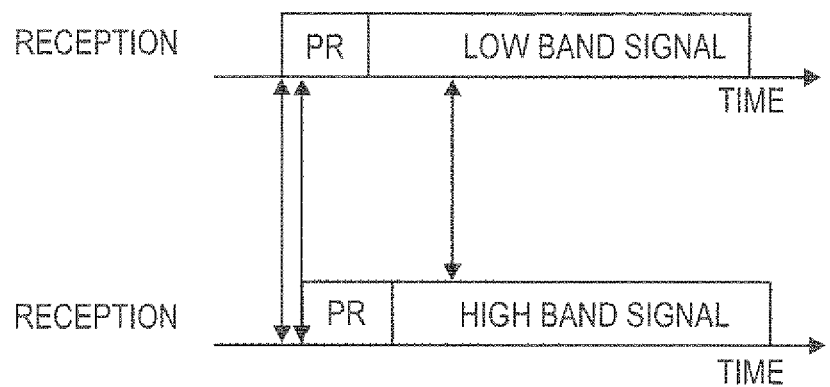
FIGS. 10A and 10B are diagrams illustrating operations of the reception in both the low band and the high band using the PLC modem according to the embodiment.
Figure 10B:
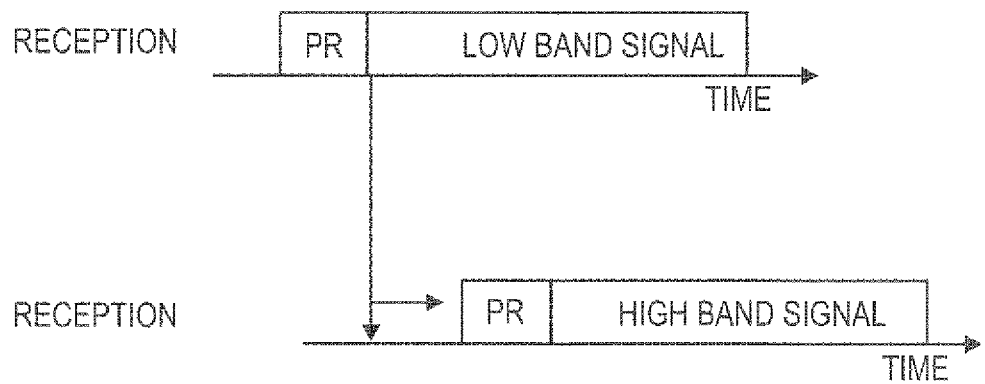

In FIGS. 10A and 10B, a preamble PR is a known signal and is generally formed by multiplexing a sine wave. Detecting the carrier, capturing the synchronization timing, and obtaining an equalization coefficient are performed using this signal. Here, timing which is not synchronized with a packet is referred to as reception timing, and timing which is extracted from a preamble of a packet by the synchronization circuit is referred to as synchronization timing.

Figure 11:
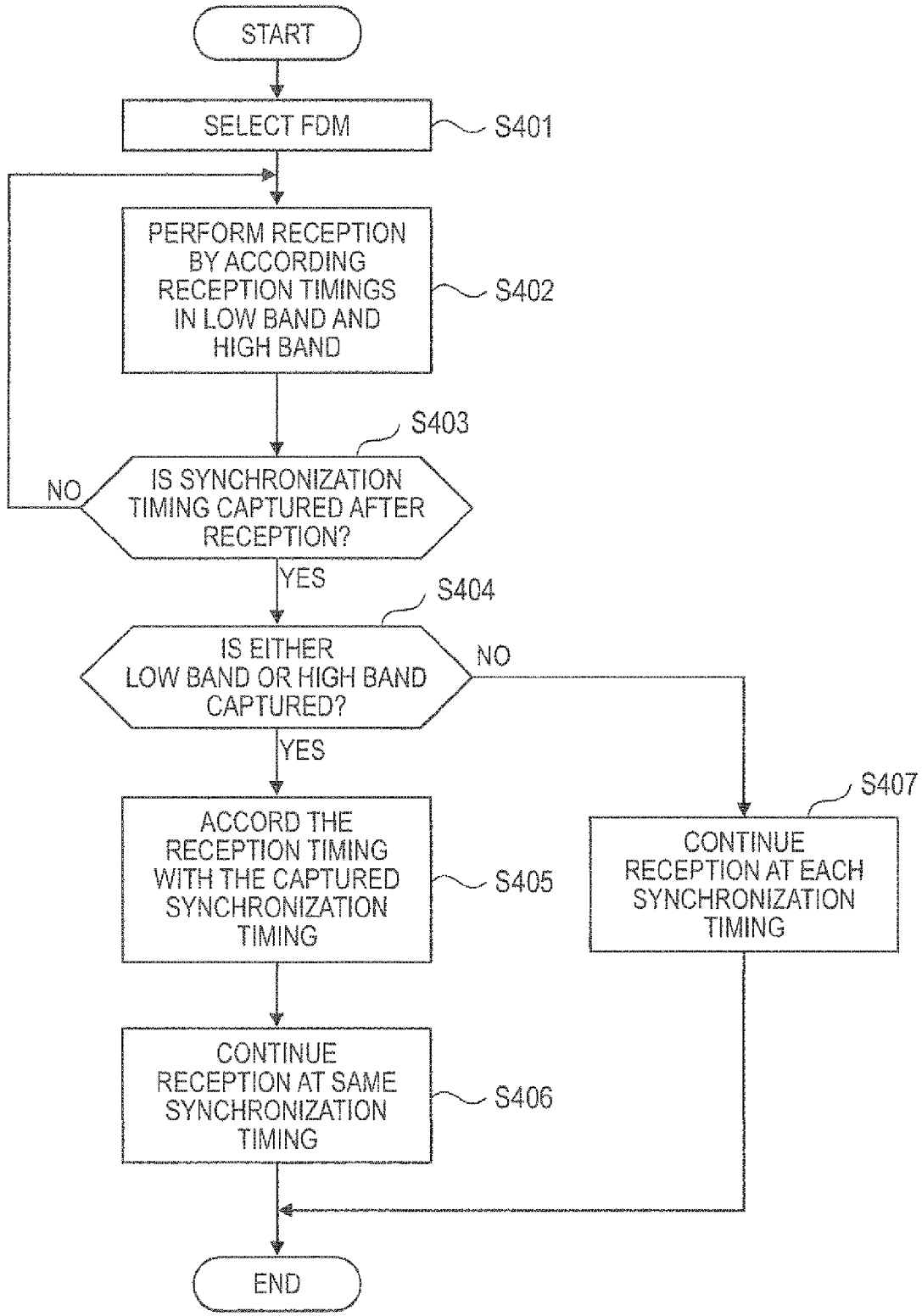
FIG. 11 is a flowchart illustrating the operations of the reception in both the low band and the high band using the PLC modem according to the embodiment.

In Step S401 of FIG. 11, the FDM mode is selected. In Step S402, the reception timings accord with each other to perform reception in the low band and the high band. The PLC modem 10 is normally in a reception mode other than the transmission timing in order to detect carriers. When the carriers are detected, capturing the synchronization timing is performed. When the synchronization timing is captured in Step S403, it is determined whether the synchronization timing is only captured in either the low band or the high band, or in both the low band and the high band in Step S404.

When it is determined that the synchronization timing is captured in either the low band or the high band, the packets are considerably deviated from each other, as in FIG. 10B. Therefore, the synchronization timing of the reception signal which is not captured is tuned to the synchronization timing of the reception signal which is captured (Step S405). The reception in both the low band and the high band continues at the same synchronization timing (Step S406). In this way, it is possible to suppress the leakage signal from the other side to a minimum, since the reception timing of the communication apparatus which is received later is tuned to the synchronization timing which is received earlier.

Alternatively, when it is determined that the synchronization timing is captured in both the low band and the high band, the packets are not considerably deviated from each other, as in FIG. 10A. Therefore, the reception continues at each of the synchronization timings (Step S407). At this times the synchronization timings may be adjusted separately. That is because a problem does not occur even in a case of slight deviation of the reception timings since the PRs almost overlap with each other and the PR is formed of a sine wave.

At the transmission timing of two packets, an offset (symbol offset between the number X to Y of symbols) of problematic transmission timing may be present depending on processing of transmission and reception algorithm. In this case, an offset domain (offset between the number X to Y of symbols) of ban transmission timing on a transmission side can be provided. For example, the offset of the transmission timing of the subsequent packet from the header of the front packet is set to be 2 or less symbols or 8 or more symbols.

In the above description, the synchronization is achieved in the low band signal and the high band signal, irrespective of arriving packets. In an initial state of communication or in a state where no packets flow, it is preferable that the synchronization is achieved using a synchronization signal. Examples of the synchronization signal include a beacon, a token, and a polling used to construct an integrated control network, for example. First, the PLC modem (master) or the repeater (proxy) checks whether the synchronization signal is transmitted over the power line communication network. When the own device constructs a network by using one-side band (the low band or the high band) in a state where the synchronization signal is transmitted using the other-side band, the own device transmits the synchronization signal in synchronization with the transmitted synchronization signal.

A synchronization flag may be set to a control signal (beacon or the like) contained in a packet. The synchronization flag is a flag used to distinguish a packet used for synchronization. In this case, the synchronization flag is first turned ON for only the packet used for the synchronization. By performing the controlling in this manner, it is possible to achieve the synchronization using only the packet suitable for the synchronization signal.

The synchronization flag may be appended to the control signal of the synchronization signal described above and turned ON. Moreover, even when the synchronization signal is not used, a normal packet may be used as the synchronization signal by appending the synchronization flag to the normal packet. It is possible to improve transmission efficiency by adjusting the synchronization and the data transmission to each other. Moreover, by using the synchronization flag, it is possible to switch between modes such as a mode where all terminals are synchronized, and a mode where all terminals are not synchronized, depending on circumstances.

Next, the PLC modem 10R which operates as a repeater between different PLC modems will be described. In a network where the PLC modems operates as a master and slaves, a beacon signal is transmitted from the master (the master 10M). In this case, the slaves (the slaves 10T) are not shown to the master (the master 10M) in some connection environments. In this case, the repeater is added to operate as a proxy. Moreover, the repeater may repeat communication between the slaves 10T as well as between the master 10M and the slaves 10T

Since the PLC modem 10R operating as the repeater also carries out the power line communication between the PLC modems 10, it is necessary to perform the transmission channel estimation (CE) before a repeating operation (communication). The PLC modem 10R normally performs the CE on the plurality of transmission channels, since the PLC modem carries out between the plurality of PLC modems 10.

Figure 12:
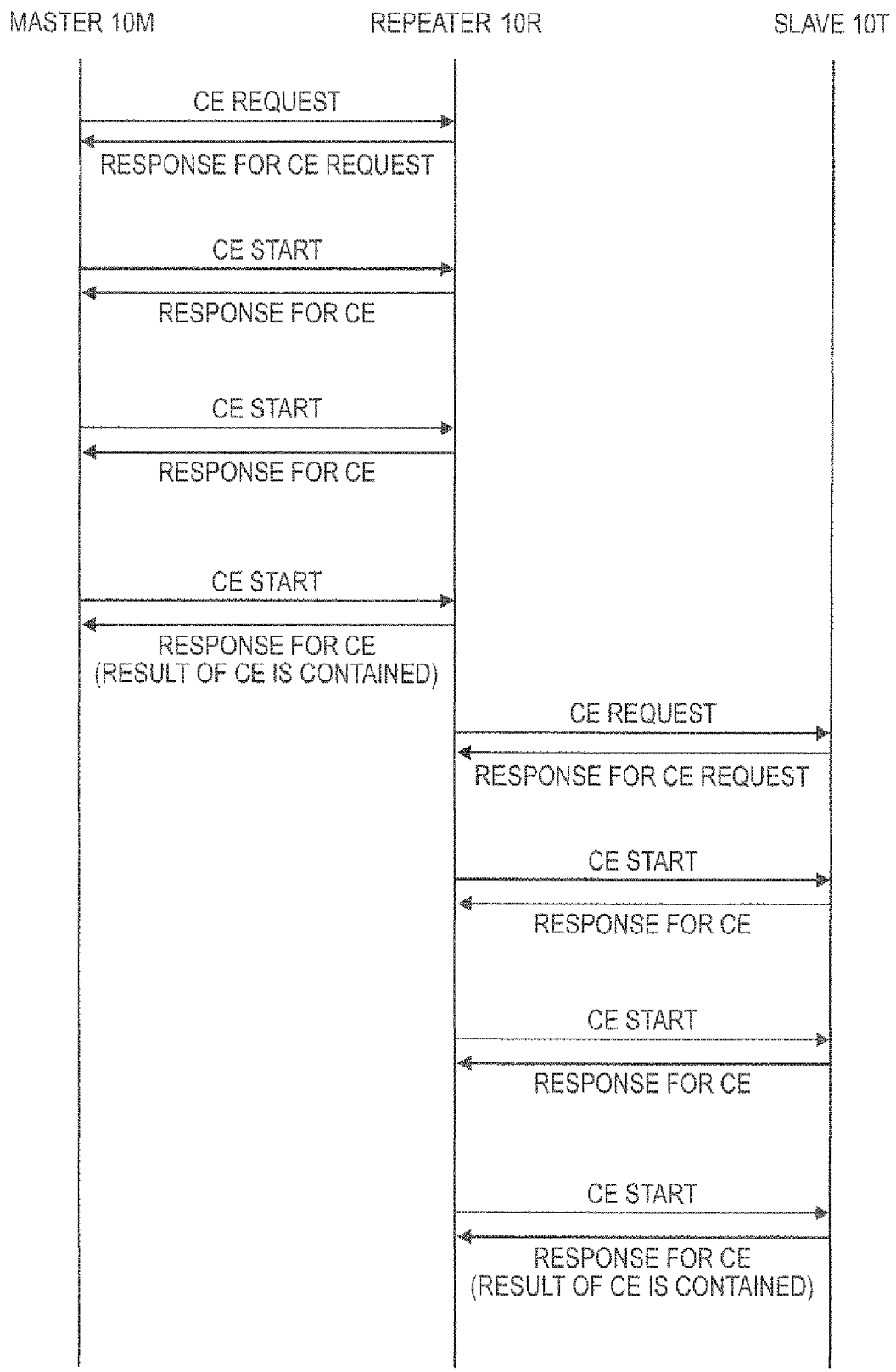
FIG. 12 is a diagram illustrating an operational flows of the transmission channel estimation using the PLC modem operating as a repeater according to the embodiment.

FIG. 12 is an operational flow illustrating operations of the CE when the communication from the master 10M to the slaves 10T is carried out via the repeater. As illustrated in FIG. 12, a CE request is transmitted from the master 10M to the repeater 10R. When a response for the CE request is returned from the repeater 10R, the transmission channel estimation using the broadband (2 MHz to 80 MHz), the transmission channel estimation using the low band (2 MHz to 30 MHz), and the transmission channel estimation using the high band (30 MHz to 80 MHz) are performed in sequence. The response for each CE is returned from the repeater 10R and the three results of each CE are appended to the final response. It is not essential that all the results of each CE are appended to the final response, but the result of each CE may be appended to each response. Alternatively, the result of each CE may not be appended to each response, but the result of each CE may be replied as an individual packet to the transmission side.

After the transmission channel estimation between the master 10M and the repeater 10R is performed, the transmission channel estimation between the repeater 10R and the slaves 10T is performed. The transmission channel estimation is started by a CE request from the repeater 10R. Like the transmission channel estimation between the master 10M and the repeater 10R, the transmission channel estimation using the broadband, and the transmission channel estimation using the low band, and the transmission channel estimation using the high band are performed. Then, the results of the transmission channel estimations are transmitted to the repeater 10R.

The repeater 10R determines communication schemes with the master 10M and the slaves 10T on the basis of the result of the transmission channel estimation with the master 10M and the result of the transmission channel estimation with the slaves 10T. Upon determining the communication schemes, the highest communication rate between the master 10M and the slaves 10T is determined. In addition, the result of the CE contains information on a modulation method of each carrier, a FEC to be used, and a TDM or an FDM as an access multiplexing method. In the function of the repeater, the CE may be limited to one time when only the TDM is restrictively used. When the transmission and reception is performed in synchronization with a power supply cycle, an operation illustrated in the figure to the right may be performed in each slot configured in synchronization with the power supply cycle.

Figure 13:
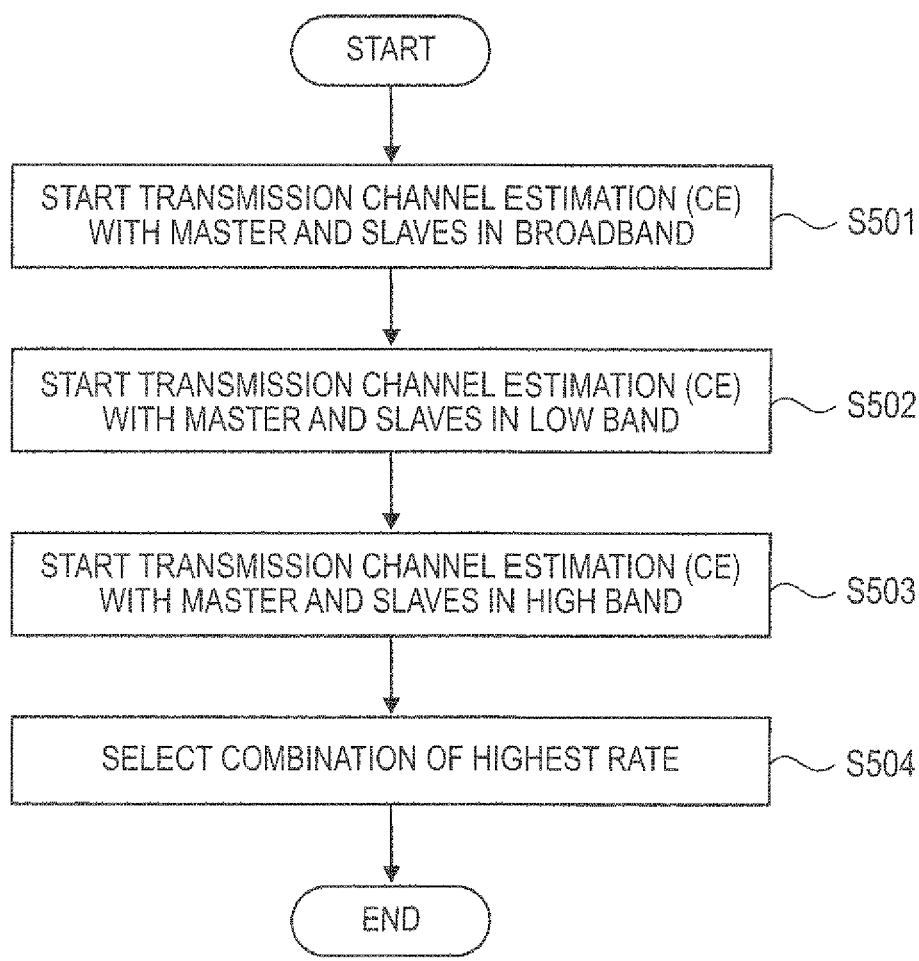
FIG. 13 is a flowchart illustrating a sequence of the transmission channel estimation by the PLC modem operating the repeater according to the embodiment.

As for the transmission channel estimation illustrated in FIG. 13, the transmission channel estimation using each communication scheme is continuously performed with the master 10M and the slaves 10T, and then the transmission channel estimation using another communication scheme is performed in the same manner. That is, in Step S501, the transmission channel estimation using the broadband is performed between the master 10M and the slaves 10T. In Step S502, the transmission channel estimation using the low band is performed between the master 10M and the slaves 10T. In Step S503, the transmission channel estimation using the high band is performed between the master 10M and the slaves 10T Subsequently, combinations for the results (bands in which communication can be carried out at the highest rate) of the highest rate are acquired using the results of the transmission channel estimations (Step S504).

When a one-side communication scheme is set to the low band and the other-side communication scheme is set to the high band, it is preferable that the communication scheme used when the repeater 10R performs the reception is set to the low band and the communication scheme used when the repeater 10R performs the transmission is set to the high band. In general, since the level difference between the low band and the high band is present and the level difference is large particularly in the power line communication, it is possible to reduce the level difference by the combinations, thereby reducing the leakage signal.

FIG. 14A is a diagram illustrating a frequency spectrum when the communication scheme used when the repeater 10R performs the reception is set to the low band and the communication scheme used when the repeater 10R performs the transmission is set to the high band. FIG. 14B is a diagram illustrating a frequency spectrum when the reception is carried out in the high band and the transmission is carried out in the low band.

Figure 17:
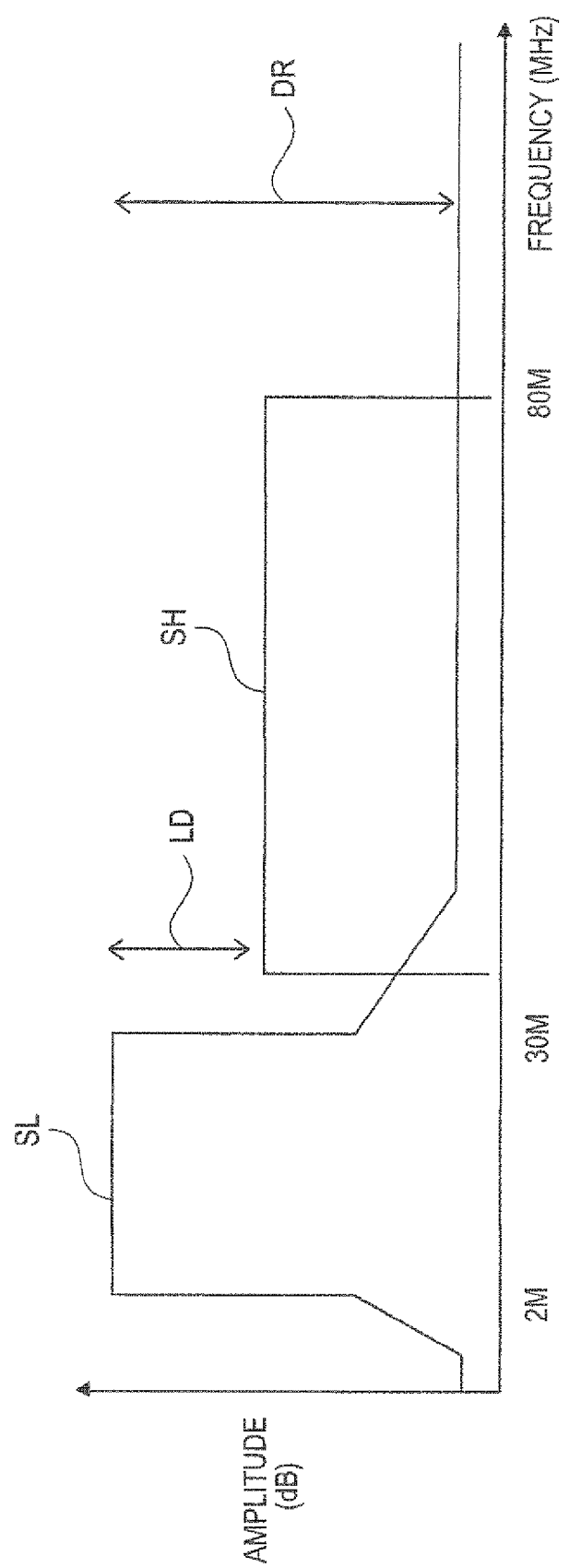
FIG. 17 is a diagram illustrating a frequency spectrum example in the power line communication in the broadband.

As for a level difference LD of the output of a spectrum between a low band spectrum SL and a high band spectrum SH, the spectrum SL of the transmission side is attenuated in FIG. 14A, but the level difference thereof is smaller than a level difference in FIG. 17 since the spectrum SH of the transmission side is amplified. On the other hand, in FIG. 14B, since an originally low spectrum SH of the reception side is further lowered and an originally high spectrum SL of he transmission side is further amplified, the level difference is larger than the level difference in FIG. 17.

When the one-side communication scheme is set to the low band and the other-side communication scheme is set to the high band, it is preferable that a side from which the repeater 10R receives a signal carries out communication using the low band and a side to which the repeater 10R transmits a signal carries out communication using the high band.

It is preferable that whether to operate the repeating operation and combination of the communication scheme of the repeating operation are indicated on the indicator 23, since it is necessary to extract the combination of the highest rate in the transmission channel estimation at time of the repeating operation. The reason for using the repeater 10R is to improve and stabilize a rate between two PLC modems 10. From the viewpoint of this reason, it is preferable that the state of the repeater 10R is indicated at connection time of the repeater 10R. At this time, it is preferable to indicate details including a scheme (communication scheme) in the repeating operation and a communication rate.

Figure 15:
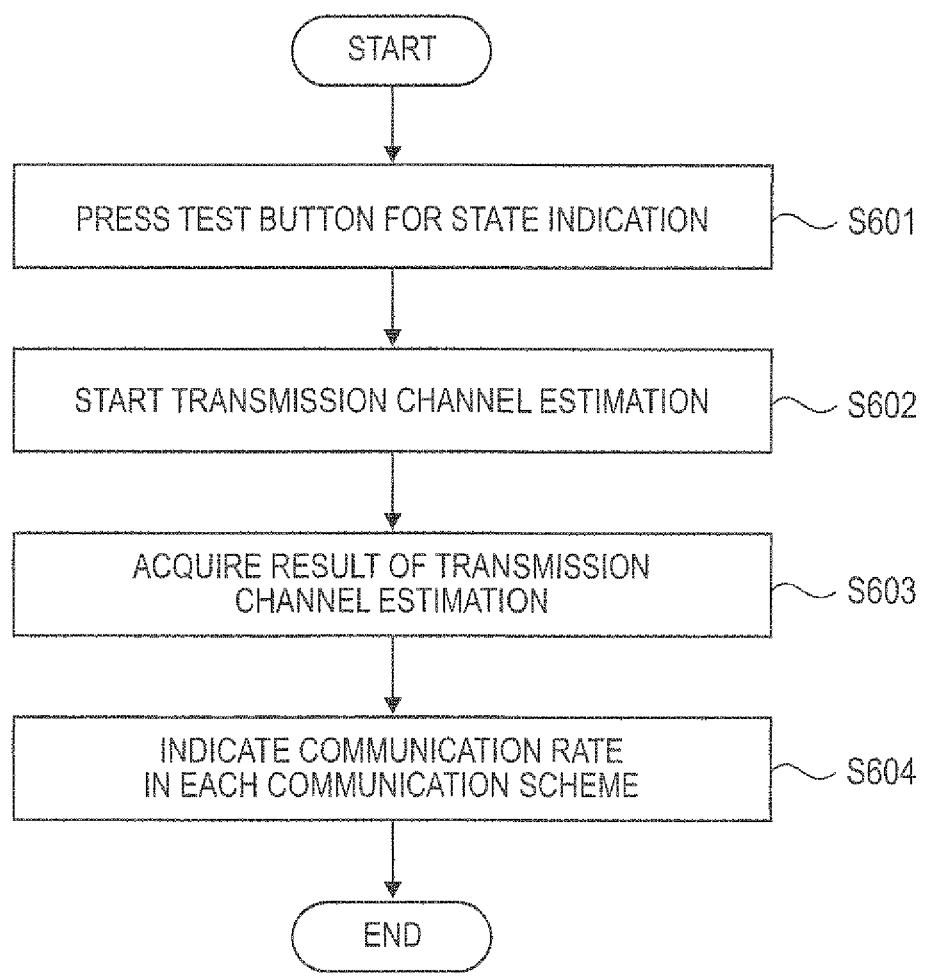
FIG. 15 is a flowchart illustrating an operation of indicating the state of the PLC modem operating as the repeater according to the embodiment.

FIG. 15 is a flowchart illustrating indication operations of the repeater When a test button (not shown) is pressed in Step S601, the transmission channel estimation is started in Step S602. In Step S603, the results of the transmission channel estimation are acquired. In Step S604, the results are indicated on the indicator 23.

In the example of FIG. 15, the test button is pressed, but the test button may not be necessarily used. For example, the transmission channel estimation may be triggered at time of connection to an outlet. The indication details show the results obtained upon performing the repeating operation at a certain point, but results having better characteristics may be indicated by comparing the results to the previous measured results. For example, the results having the better characteristics are shown by flickering of an LED or colors by comparing the previous measured results to the present measured results. Some users take an interest to characteristics at a specific point, and want to find the point having the relatively best characteristics in some cases Therefore, it is necessary to examine an indicating device and an indicating method. However, when only the relative characteristics are indicated, an indicating device and an indicating method are simplified, and necessity minimum results can be indicated to a user.

Figure 16A:
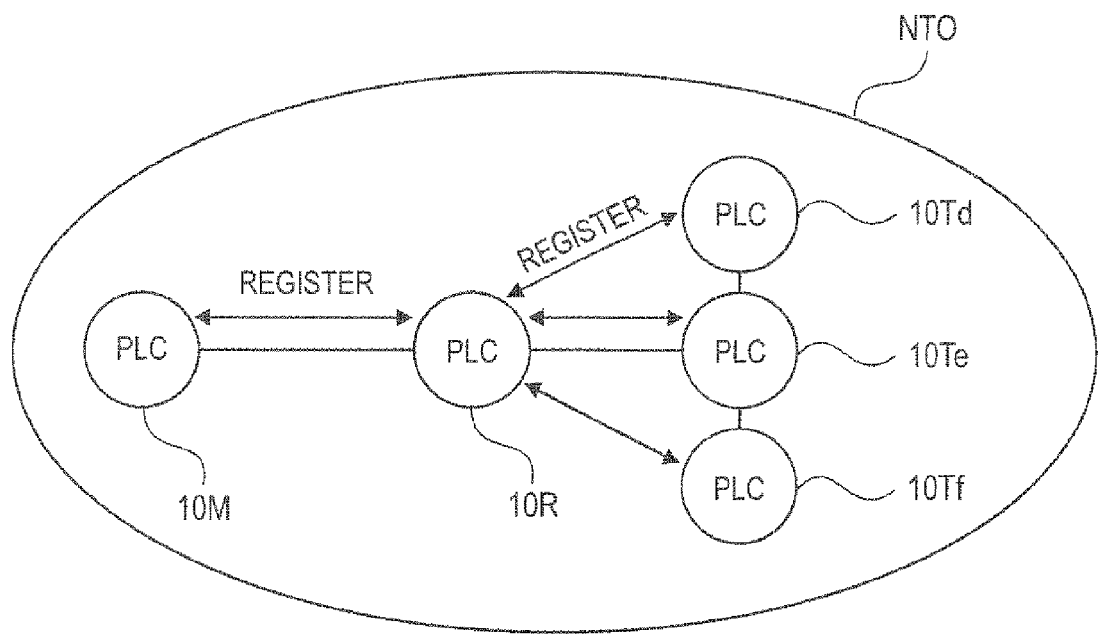
FIGS. 16A and 16B are diagrams illustrating installation examples of the repeater according to the embodiment.
Figure 16B:
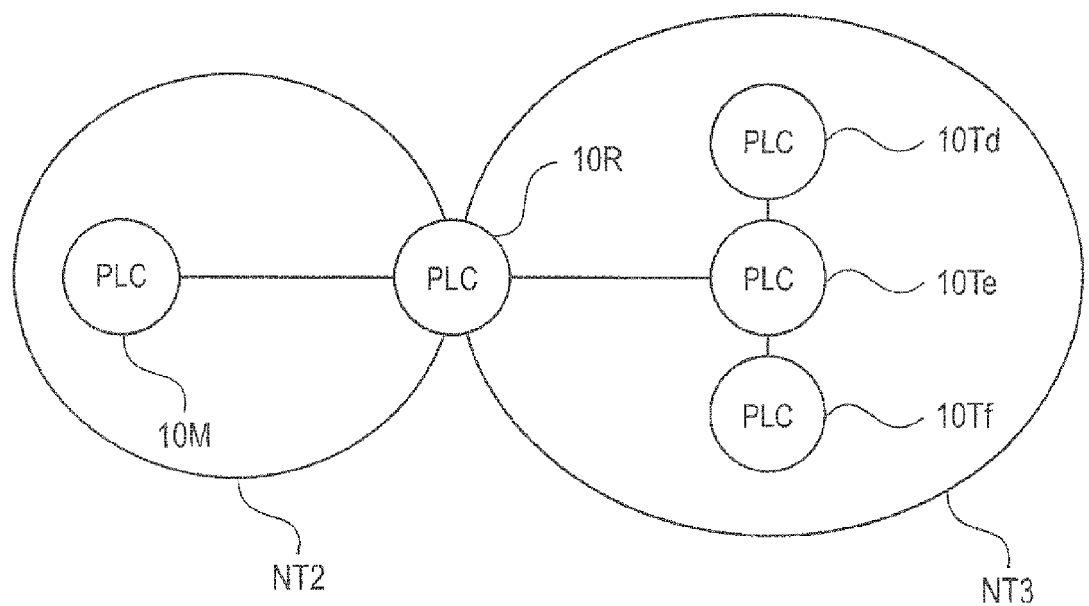

In the case of the PLC modems 10 which construct the integrated control network for using the beacon, it is considered that the repeater 10R operates as the proxy FIGS. 16A and 16B show installation examples of the repeater 10R. In the example of FIGS. 16A and 16B, slaves 10Td, 10Te, and 10Tf are invisible from the master 10M and the repeater 10R is connected therebetween. The slaves 10Td, 10Te, and 10Tf are already registered in the repeater 10R and the repeater 10R is registered in the master 10M. The master 10M carries out communication with the repeater 10R and the repeater 10R carries out communication with the slaves 10Td, 10Te, and 10Tf. The master 10M and the slaves 10Td, 10Te, and 10Tf are not registered directly to each other. The repeater 10R handles signals from the master 10M and the slaves 10Td, 10Te, and 10Tf, but the master 10M and the slaves 10Td, 10Te, and 10Tf handle only a signal from the repeater 10R.

With such a configuration, the slaves 10Td, 10Te, and 10Tf or the master 10M do not perform double data processing, even when the signal from the master 10M arrives to the slaves 10Td, 10Te, and 10Tf or the signals from the slaves 10Td, 10Te, and 10Tf arrive to the master 10M. Therefore, it is possible to perform a stable operation. In this case, the repeater 10R informs a beacon or a control signal transmitted from the master 10M to the slaves 10Td, 10Te, and 10Tf under the control of the repeater 10R and repeats data communication between the master 10M and the slaves 10Td, 10Te, and 10Tf.

In order to indicate a communication rate by the repeater 10R, a rate between the master 10M and the repeater 10R and a communication rate between the repeater 10R and the slaves 10Td, 10Te, and 10Tf are used. When the plurality of slaves 10Td, 10Te, and 10Tf carry out communication, only one communication rate may be used as a representative value or an average value may be used. When a logic network is constructed by two different networks illustrated as in FIG. 16B, the repeater 10R can indicate a communication rate by using a rate between the master 10M and the repeater 10R and the communication rate between the repeater 10R and the slaves. When a communication rate between the master 10M and specific slave 10Td to 10Tf, the communication rate between the master 10M and the specific slave 10Td, 10Te, or 10Tf can be indicated by pressing the test button of the slave 10Td, 10Te, or 10Tf. The repeater 10R receives signals of a test mode from the slaves 10Td, 10Te, and 10Tf and transmits the test mode to the master 10M connected thereto. Upon indicating the communication rate in the slaves 10Td, 10Te, and 10Tf, it is necessary to transmit the communication rate between the master 10M and the repeater 10R to the slave side.

In the repeater 10R which carries out communication for the repeating operation separately in the low band and the high band, it is necessary to control timing of each transmission signal or timing of each reception signal and reduce the leakage signal by achieving the synchronization (synchronization in the symbol unit), since only one repeater is used for the PLC modem 10. Moreover, description for the timing control of the transmission and reception signals is omitted, since the details is described above in the description of the reduction in the leakage signal in the communication between the PLC modems.

Control of the transmission and reception timing in the FDM mode described above is performed by a communication controller realized mainly by the CPU 31A. In the above description, the frequency band from 2 MHz to 80 MHz is used, but this is not limited thereto. A broader band or a narrower band may be used.

The communication apparatus having the above-described configuration may carry out communication using a power line as the transmission channel.

In the communication apparatus having the above-described configuration, the multicarrier communication may be communication in an OFDM scheme.

The communication apparatus having the above-described configuration may further include: a communication performance acquiring unit which acquires communication performances in communicating with the first communication unit, the second communication unit, and the third communication unit; and a communication controller which carries out communication by selecting at least one among the first communication unit, the second communication unit, and the third communication unit on the basis of the communication performances.

In the communication apparatus, the communication performances of the first communication unit, the second communication unit, and the third communication unit may be acquired before the communication with the other communication apparatus, and at least one among the first communication unit, the second communication unit, and the third communication unit may be selected on the basis of the communication performances for carrying out communication. Accordingly, it is possible to carry out the most efficient communication with another communication apparatus.

In the communication apparatus having the above-described configuration, the communication performance is a communication rate.

In the communication apparatus having the above-described configuration, the communication controller may repeat communication between the first other communication apparatus and the second other communication apparatus different from the first other communication apparatus by using at least one among the first communication unit, the second communication unit, and the third communication unit.

According to the communication apparatus having the above-described configuration, it is possible to carry out a repeating operation using each optimum communication unit even when the communication performance of the transmission channel with one-side communication apparatus is different from the communication performance of the transmission channel with the other-side communication apparatus.

In the communication apparatus having the above-described configuration, the communication controller may receive a signal transmitted from the first other communication apparatus or the second other communication apparatus using the first communication unit, and may transmit the signal to the first other communication apparatus or the second other communication apparatus using the second communication unit.

According to the communication apparatus having the above-described configuration, it is possible to reduce an influence of the leakage signal, even when an output level of the communication using a high frequency band is restrictive.

In the communication apparatus having the above-described configuration, the communication performance acquiring unit may acquire a communication performance of the transmission channel with the first other communication apparatus and a communication performance of the transmission channel with the second other communication apparatus. In addition, the communication controller may select the communication unit to be used for communication with the first other communication apparatus and the communication unit to be used for communication with the second other communication apparatus on the basis of each of the communication performances.

The communication apparatus having the above-described configuration may further include an indicator which indicates the communication performances.

According to the communication apparatus having the above-described configuration, it is possible to easily select a location where the communication apparatus performing the repeating operation is installed.

In the communication apparatus having the above-described configuration, the third communication unit may synchronize in a symbol unit, first data communicated by the first communication unit with second data communicated by the second communication unit.

According to the communication apparatus having the above-described configuration, it is possible to suppress the leakage signal of the communication signal caused by the other-side communication unit to a minimum This advantage is particularly effective for the case where the first communication unit and the second communication unit operates separately and communication is carried out with two different communication apparatuses.

In the communication apparatus having the above-described configuration, the third communication unit may synchronize a header of a first packet communicated by the first communication unit with a header of a second packet communicated by the second communication unit.

According to the communication apparatus having the above-described configuration, it is possible to suppress the leakage signal of the communication signal caused by the other-side communication unit to a minimum. This advantage is particularly effective for the case where the first communication unit and the second communication unit operates separately and communication is carried out with two different communication apparatuses.

In the communication apparatus having the above-described configuration, a symbol length of the first data communicated by the first communication unit may be the integral multiple of a symbol length of the second data communicated by the second communication unit.

The communication apparatus using a short symbol length and the communication apparatus using the symbol length of the integral multiple have no orthogonal relation one another, but the reverse may have the orthogonal relation. According to the communication apparatus, the communication signals of two communication units are orthogonal one another in one direction when the synchronization timings of the symbol accord with each other. Accordingly, there is no influence of the leakage signal of the communication signal caused by the other-side communication unit. Even when the synchronization timings are slightly deviated, characteristic deterioration caused due to collapse of the orthogonality between the communication signals of the two communication units is small for one direction. This advantage is particularly effective for the case where the first communication unit and the second communication unit operates separately and communication is carried out with two different communication apparatuses.

The communication apparatus having the above-described configuration may further include a cycle detector which detects a cycle of an AC power supply of the power line. The first communication unit, the second communication unit, and the third communication unit may carry out communication in synchronization with the cycle of the AC power supply.

According to the communication apparatus having the above-described configuration, it is possible to carry out communication with good efficiency by processing communication in synchronization with the AC power supply, even when a frequency characteristic of the power line varying with synchronization of the AC power supply or a noise of the power line occurs.

In the communication apparatus having the above-described configuration, the third communication unit may synchronize a timing of first communication processing carried out by the first communication unit with a timing of second communication processing carried out by the second communication unit.

According to the communication apparatus having the above-described configuration, since the third communication unit synchronizes the timing of first communication processing carried out by the first communication unit with the timing of second communication processing carried out by the second communication unit, it is possible to reduce at a minimum the leakage of communication signal of another communication unit Accordingly, it is especially effective in case that the first communication unit and the second communication unit independently operate, and the communication between two communication apparatuses are repeated. In the communication apparatus having the above-described configuration, the third communication unit may synchronize a start timing of the first communication processing with a start timing of the second communication processing.

According to the communication apparatus having the above-described configuration, since the third communication unit synchronizes the start timing of the first communication processing with the start timing of the second communication processing, it is possible to reduce at a minimum the leakage of communication signal of another communication unit. Accordingly, it is especially effective in case that the first communication unit and the second communication unit independently operate, and the communication between two communication apparatuses are repeated.

In the communication apparatus having the above-described configuration, the first communication unit carries out the communication of first data containing a first symbol, the second communication unit carries out the communication of second data containing a second symbol, and the third communication unit synchronizes the timing of the communication of the first symbol with the timing of the communication of the second symbol.

According to the communication apparatus having the above-described configuration, since the timing of the communication of the first symbol is synchronized with the timing of the communication of the second symbol, the orthogonality is given between the first communication processing and the second communication processing. Thus, it is possible to reduce at a minimum the leakage of communication signal of another communication unit. Accordingly, it is especially effective in case that the first communication unit and the second communication unit independently operate, and the communication between two communication apparatuses are repeated.

In the communication method, the transmission channel may be a power line.

In the communication method, the multicarrier communication may be communication in an OFDM scheme.

The communication method may further include: acquiring communication performances in communicating by the first communication, the second communication, and the third communication; and carrying out communication by selecting at least one among the first communication, the second communication, and the third communication on the basis of the communication performances.

In the communication method, the communication performances of the first communication unit, the second communication unit, and the third communication unit are acquired before the communication with the other communication apparatus, and at least one among the first communication, the second communication, and the third communication is selected on the basis of the communication performances for carrying out communication. Accordingly, it is possible to carry out the most efficient communication with the other communication apparatus.

In the communication method, the communication performance may be a communication rate.

In the communication method, communication may be repeated between the first other communication apparatus and a second other communication apparatus different from the first other communication apparatus by using at least one among the first communication, the second communication, and the third communication.

According to the communication method, it is possible to carry out a repeating operation using optimum communication even when the communication performance of the transmission channel with one-side communication apparatus is different from the communication performance of the transmission channel with another-side communication apparatus.

In the communication method, a signal transmitted from the first other communication apparatus or the second other communication apparatus may be received using the first communication. In addition, the signal may be transmitted to the first other communication apparatus or the second other communication apparatus using the second communication.

According to the communication method described above, it is possible to reduce an influence of the leakage signal, even when an output level of the communication using a high frequency band is restrictive.

In the communication method, a communication performance of the transmission channel with the first other communication apparatus and a communication performance of the transmission channel with the second other communication apparatus may be acquired. In addition, communication to be used for communication with the first other communication apparatus and communication to be used for communication with the second other communication apparatus may be selected on the basis of each of the communication performances.

The communication method may further include indicating the communication performances.

According to the communication method described above, it is possible to easily select a location for installing the communication apparatus performing the repeating operation.

In the communication method, first data communicated by the first communication may be synchronized with second data communicated by the second communication in a symbol unit.

With the communication method, it is possible to suppress the leakage signal of the communication signal by the other-side communication. This advantage is particularly effective for the case where the first communication and the second communication are carried out separately and communication is carried out with two different communication apparatuses.

In the communication method, wherein a header of a first packet communicated by the first communication unit is synchronized with a header of a second packet communicated by the second communication.

According to the communication method, it is possible to suppress the leakage signal of the communication signal caused by the other-side communication unit to a minimum. This advantage is particularly effective for the case where the first communication and the second communication operates separately and communication is carried out with two different communication apparatuses.

In the communication method, a symbol length of the first data communicated by the first communication may be the integral multiple of a symbol length of the second data communicated by the second communication.

The communication apparatus using a short symbol length and the communication apparatus using the symbol length of the integral multiple have no orthogonal relation one another, but the inverse may have the orthogonal relation. According to the communication method, the communication signals of two communications are orthogonal one another in one direction when the synchronization timings of the symbol accord with each other. Accordingly, there is no influence of the leakage signal of the communication signal caused by the other-side communication. Even when the synchronization timings are slightly deviated, characteristic deterioration caused due to collapse of the orthogonality between the communication signals of the two communication units is small for one direction. This advantage is particularly effective for the case where the first communication and the second communication operate separately and communication is carried out with two different communications.

The communication method may further include detecting a cycle of an AC power supply of the power line. The first communication, the second communication, and the third communication may be synchronized with the is cycle of the AC power supply.

According to the communication method, it is possible to carry out efficient communication by processing communication in synchronization with the AC power supply even when a frequency characteristic of the power line varying with synchronization of the AC power supply or a noise of the power line occurs.

In the communication method having the above-described configuration, a timing of process in the first communication is synchronized with a timing of process in the second communication.

According to the communication apparatus having the above-described configuration, since the timing of process in the first communication is synchronized with the timing of process in the second communication, it is possible to reduce at a minimum the leakage of communication signal of another communication unit. Accordingly, it is especially effective in case that the first communication unit and the second communication unit independently operate, and the communication between two communication apparatuses are repeated.

In the communication method having the above-described configuration, a start timing of the process in the first communication may be synchronized with a start timing of the process in the second communication.

According to the communication method having the above-described configuration, since the start timing of the process in the first communication is synchronized with the start timing of the process in the second communication, it is possible to reduce at a minimum the leakage of communication signal of another communication unit. Accordingly, it is especially effective in case that the first communication unit and the second communication unit independently operate, and the communication between two communication apparatuses are repeated.

In the communication method having the above-described configuration, communication process of first data containing a first symbol is carried out in the first communication, communication process of second data containing a second symbol is carried out in the second communication, and the timing of the communication process of the first symbol is synchronized with the timing of the communication process of the second symbol.

According to the communication method having the above-described configuration, since the timing of the communication of the first symbol is synchronized with the timing of the communication of the second symbol, the orthogonality is given between the first communication processing and the second communication processing. Thus, it is possible to reduce at a minimum the leakage of communication signal of another communication unit. Accordingly, it is especially effective in case that the first communication unit and the second communication unit independently operate, and the communication between two communication apparatuses are repeated.

The invention is effective in a communication apparatus, a communication method, and an integrated circuit capable of carrying out efficient communication using a broadband frequency band.

This application is based upon and claims the benefit of priority of Japanese Patent Application No. 2007-277641 filed on Oct. 25, 2007, the contents of which are incorporated herein by reference in its entirety.

What is claimed is:

1. A communication apparatus which carries out multicarrier communication with a first other communication apparatus and a second other communication apparatus through a transmission channel, the communication apparatus comprising:

a first communication unit which carries out a first multicarrier communication with the first other communication apparatus through the transmission channel using a first frequency band;

a second communication unit which carries out a second multicarrier communication with the second other communication apparatus through the transmission channel using a second frequency band different from the first frequency band, wherein the first communication unit synchronizes the first multicarrier communication with the second multicarrier communication in a symbol unit.

2. The communication apparatus according to claim 1, wherein the transmission channel is a power line.

3. The communication apparatus according to claim 1, wherein the first communication unit synchronizes a reception timing of the first multicarrier communication with a reception timing of the second multicarrier communication carried out by the second communication unit.

4. The communication apparatus according to claim 1, further comprising:
a communication control unit which carries out a third multicarrier communication using the first band and the second band by using the first communication unit and the second communication unit concurrently;
a communication performance acquiring unit which acquires communication performance relevant to the first multicarrier communication, the second multicarrier communication and the third multicarrier communication respectively;
wherein the communication control unit which carries out communication with the first other communication apparatus and the second other communication apparatus by selecting at least one among the first multicarrier communication, the second multicarrier communication and the third multicarrier communication on the basis of the communication performances.

5. The communication apparatus according to claim 4, wherein the communication control unit repeats a data between the first other communication apparatus and the second other communication apparatus by using at least one among the first multicarrier communication, the second multicarrier communication and the third multicarrier communication on the basis of the communication performances.

6. The communication apparatus according to claim 1, wherein the first multicarrier communication and the second multicarrier communication are communication in an OFDM scheme.

7. The communication apparatus according to claim 6, wherein a frequency interval of the OFDM of the first multicarrier communication is an integer multiple of a frequency interval of the OFDM in the second multicarrier communication.

8. The communication apparatus according to claim 1, wherein the first communication unit synchronizes a synchronization timing of a first packet communicated by the first communication unit with a reception timing of a second packet communicated by the second communication unit.

9. The communication apparatus according to claim 6, wherein a symbol length of the first OFDM data communicated by the first communication unit is an integral multiple of a symbol length of the second OFDM data communicated by the second communication unit.

10. The communication apparatus according to claim 2, further comprising a cycle detector which detects a cycle of an AC power supply of the power line, wherein the first communication unit and the second communication unit carry out communication in synchronization with the cycle of the AC power supply.

11. The communication apparatus according to claim 1, wherein the second communication unit synchronizes a transmission timing of the first multicarrier communication carried out by the first communication unit with a transmission timing of the second multicarrier communication carried out by the second communication unit.

12. The communication apparatus according to claim 1, wherein the first communication unit synchronizes a transmission timing of the first multicarrier communication with a reception timing of the second multicarrier communication carried out by the second communication unit.

13. The communication apparatus according to claim 1,
wherein the first communication unit carries out the first multicarrier communication of a first data containing a first symbol,
wherein the second communication unit carries out the second multicarrier communication of a second data containing a second symbol, and
wherein a timing of the first symbol is synchronized with a timing of the second symbol.

14. A communication method for carrying out multicarrier communication with a first other communication apparatus and a second other communication apparatus through a transmission channel, the method comprising:
carrying out first multicarrier communication with the first other communication apparatus through the transmission channel using a first frequency band;
carrying out second multicarrier communication with the second other communication apparatus through the transmission channel using a second frequency band different from the first frequency band,
wherein the first multicarrier communication is synchronized with the second multicarrier communication in a symbol unit.

15. The communication method according to claim 14, wherein the transmission channel is a power line.

16. The communication method according to claim 14, wherein the first multicarrier communication and the second multicarrier communication are communication in an OFDM scheme.

17. The communication method according to claim 14, wherein a synchronization of a first packet communicated by the first multicarrier communication is synchronized with a reception timing of a second packet communicated by the second multicarrier communication.

18. The communication method according to claim 16, wherein a symbol length of the first OFDM data communicated by the first multicarrier communication is an integral multiple of a symbol length of the second OFDM data communicated by the second multicarrier communication.

19. The communication method according to claim 14, further comprising
detecting a cycle of an AC power supply of the power line,
wherein the first multicarrier communication and the second multicarrier communication are synchronized with the cycle of the AC power supply.

20. The communication method according to claim 14, wherein a transmission timing of the first multicarrier communication is synchronized with a transmission timing of the second communication.

21. The communication method according to claim 14, wherein a transmission timing of the first multicarrier communication is synchronized with a reception timing of the second multicarrier communication.

22. The communication method according to claim 14,
wherein a first data containing a first symbol is carried out in the first multicarrier communication,
wherein a second data containing a second symbol is carried out in the second multicarrier communication, and
wherein a timing of the first symbol is synchronized with a timing of the second symbol.

23. An integrated circuit which is used in a communication apparatus for carrying out multicarrier communication with a first other communication apparatus and a second other communication apparatus thorough a transmission channel, the integrated circuit comprising:
- a first communication unit which carries out a first multicarrier communication with the first other communication apparatus through the transmission channel using a first frequency band; and
- a second communication unit which carries out a second multicarrier communication with the second other communication apparatus through the transmission channel using a second frequency band higher than the first frequency band,
wherein the first communication unit synchronizes the first multicarrier communication with the second multicarrier communication in a symbol unit.

* * * * *